United States Patent [19]
Sharpe et al.

[11] Patent Number: 5,153,999
[45] Date of Patent: Oct. 13, 1992

[54] AUTO LEVEL CRADLE

[75] Inventors: Kim Sharpe, Rollingstone; Gerald Lawson; Thomas A. Ryan, both of Winona, all of Minn.

[73] Assignee: DCM Tech, Inc., Winona, Minn.

[21] Appl. No.: 685,091

[22] Filed: Apr. 12, 1991

[51] Int. Cl.⁵ .................................................. G01C 9/06
[52] U.S. Cl. .......................................... 33/366; 33/382
[58] Field of Search ............... 33/366, 381, 382, 379

[56] References Cited

U.S. PATENT DOCUMENTS

| | | | |
|---|---|---|---|
| 625,019 | 5/1899 | Cardell | 33/382 |
| 3,782,847 | 1/1974 | Kulzer | |
| 4,127,942 | 12/1978 | Flaten | |
| 4,478,009 | 10/1984 | Rukavina et al. | |
| 4,567,666 | 2/1986 | Neis et al. | 33/366 X |
| 4,607,578 | 8/1986 | Inoue | |
| 4,654,977 | 4/1987 | Pakus | 33/366 |
| 4,720,920 | 1/1988 | Tudek | 33/366 |
| 4,729,192 | 3/1988 | Elsdoerfer | |

FOREIGN PATENT DOCUMENTS 1227123 7/1968 United Kingdom ................. 33/382

Primary Examiner—Harry N. Haroian
Attorney, Agent, or Firm—Vidas & Arrett

[57] ABSTRACT

A system for automatically orienting a cylinder head such that a valve guide inserted into a guide is perpendicular to the ground.

4 Claims, 40 Drawing Sheets

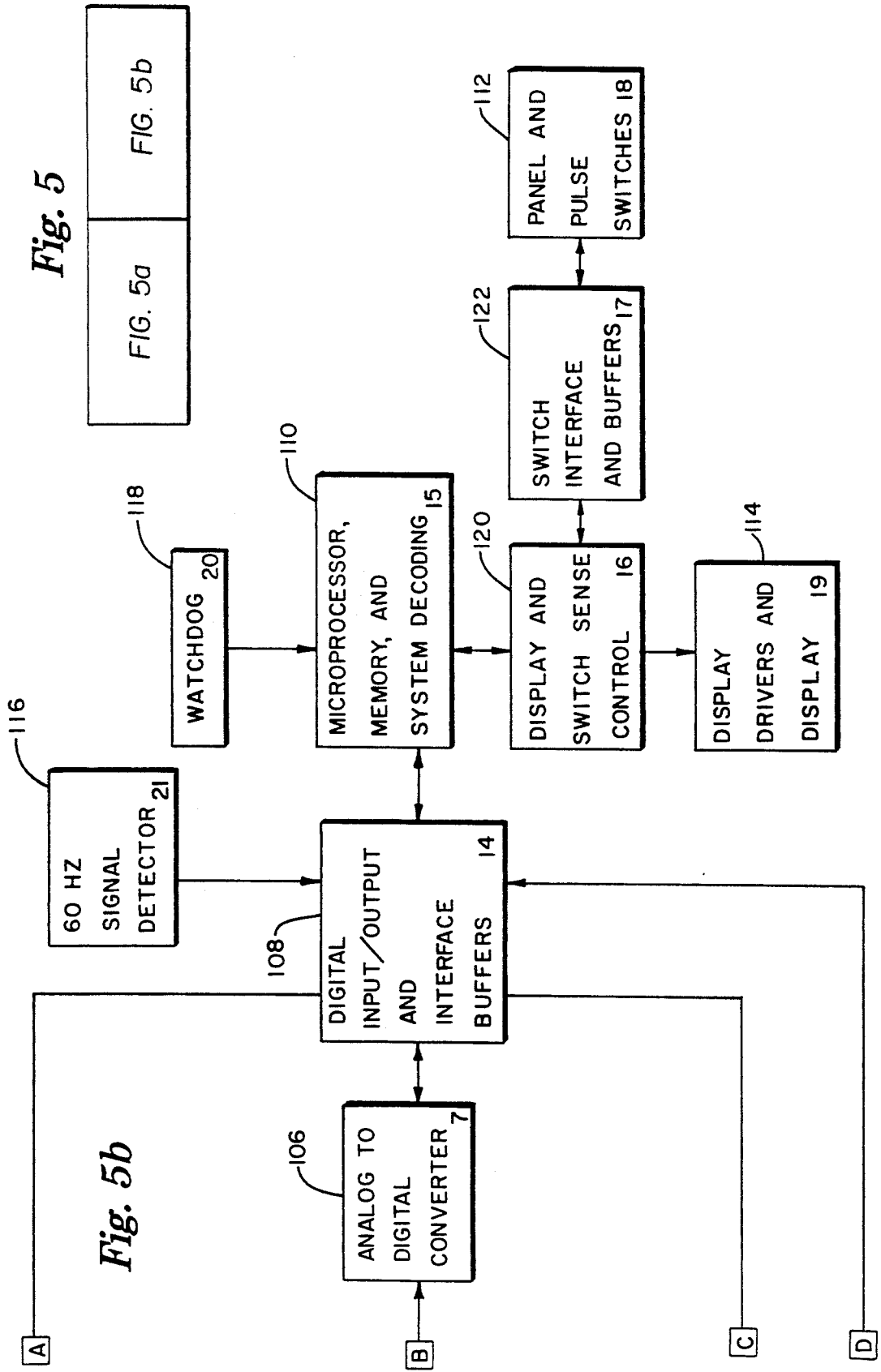

Fig. 6a

| | | |
|---|---|---|
| FIG. 6a-1 | FIG. 6a-2 | FIG. 6a-3 |
| FIG. 6a-4 | FIG. 6a-5 | FIG. 6a-6 |

Fig. 6b

| | |
|---|---|
| FIG. 6b-1 | FIG. 6b-2 |
| FIG. 6b-3 | FIG. 6b-4 |

Fig. 6c

| | |
|---|---|
| FIG. 6c-1 | FIG. 6c-2 |
| FIG. 6c-3 | FIG. 6c-4 |

Fig. 6d

| | |
|---|---|
| FIG. 6d-1 | FIG. 6d-3 |
| FIG. 6d-2 | |

Fig. 7a

| | |
|---|---|
| FIG. 7a-1 | FIG. 7a-2 |
| FIG. 7a-3 | FIG. 7a-4 |

Fig. 7b

| | |
|---|---|
| FIG. 7b-1 | FIG. 7b-2 |
| FIG. 7b-3 | FIG. 7b-4 |

Fig. 8

| | | |
|---|---|---|
| FIG. 8A | FIG. 8B | FIG. 8C |
| FIG. 8D | FIG. 8E | FIG. 8F |
| FIG. 8G | FIG. 8H | FIG. 8I |

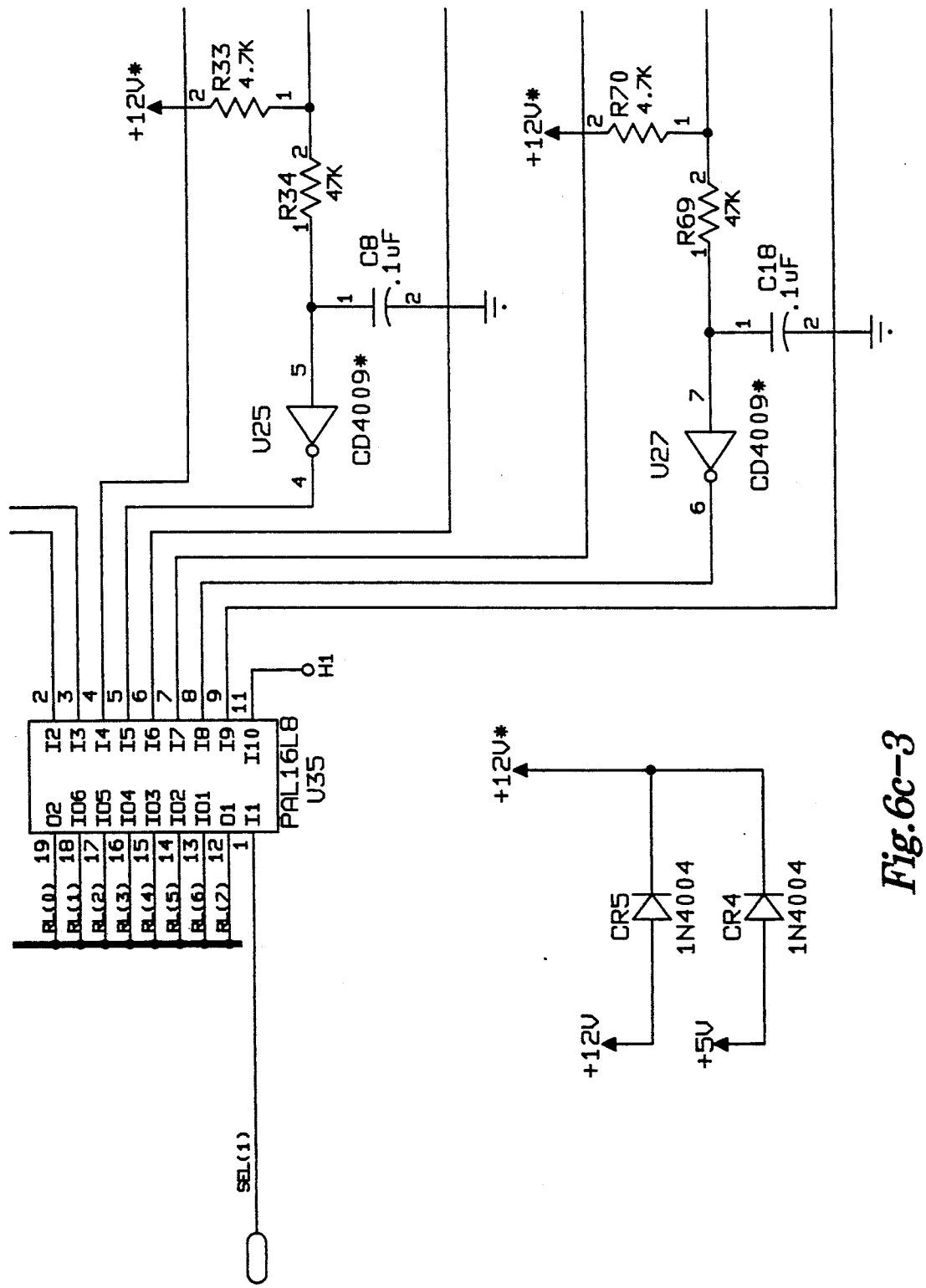

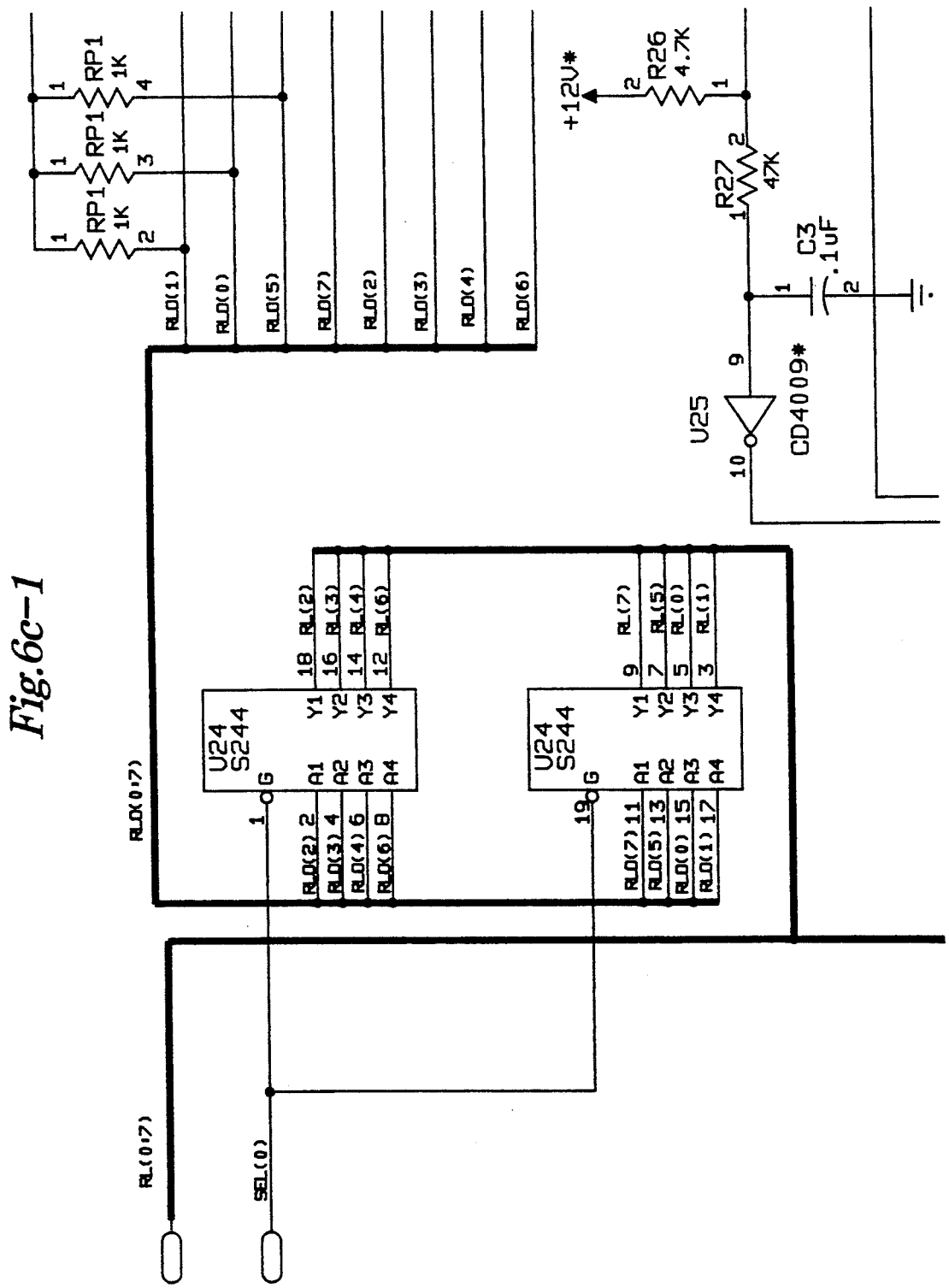

Fig.6d-3
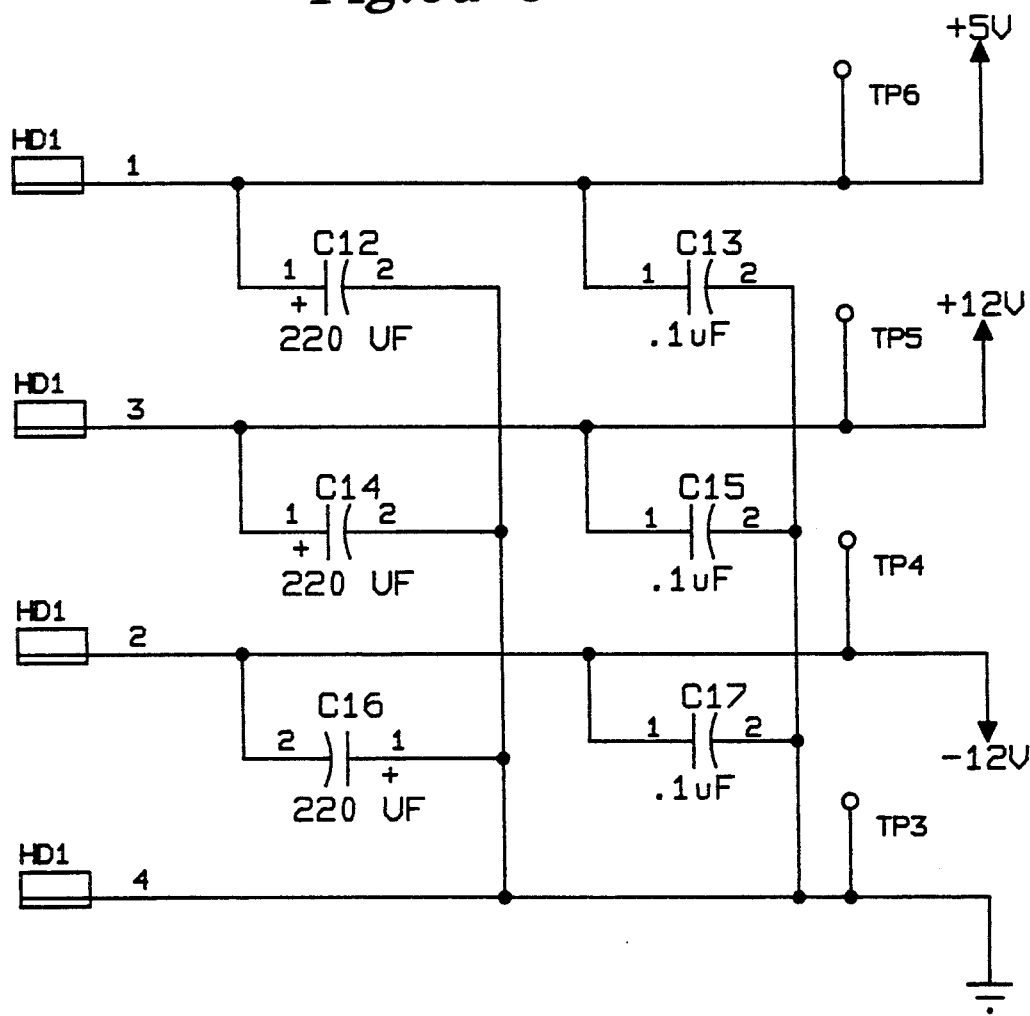
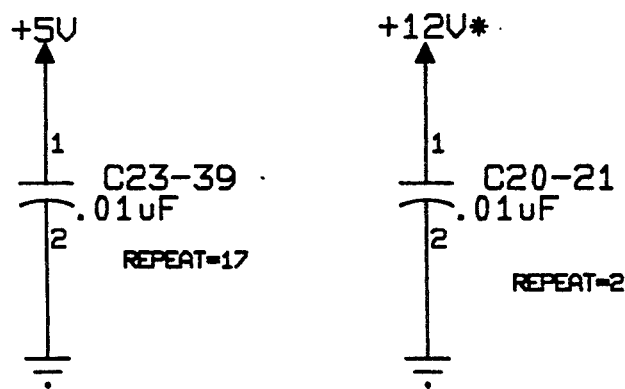
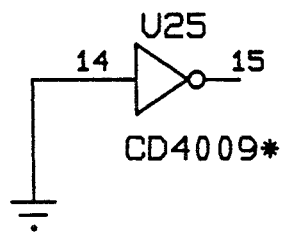

AUTO LEVEL CRADLE

BACKGROUND OF THE INVENTION

1. Field Of The Invention

This invention relates to a positioning device, and more particularly, to an automatically leveling cradle for use in aligning a workpiece such as a cylinder head to be machined.

2. Description Of The Related Art

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

U.S. Pat. No. 4,729,129, entitled "Machining Apparatus And Workpiece Holding Assembly Therefor", issued Mar. 8, 1988 to Elsdoerfer, is directed to a computer controlled machining apparatus which is capable of rotating the workpiece about one axis. No sensor is used to provide feedback to a microprocessor.

U.S. Pat. No. 4,607,578, entitled "Positioning Mechanism", issued Aug. 26, 1986 to Inoue, is directed to a device which provides six degrees of freedom, including linear movement along each of three mutually perpendicular axes, and rotational movement about each of these three axes. This device does not disclose attaching a sensor to the actual work piece and using this to align the work piece with a predetermined plane.

U.S. Pat. No. 4,127,942, entitled "Method And Apparatus For Reconditioning Cylinder Heads", issued Dec. 5, 1978 to Flaten, is directed to a device which uses a spirit guide for alignment purposes. This device does not disclose using a computer in combination with a sensor to provide alignment information to the computer to control the motors which rotate the cradle.

U.S. Pat. No. 3,782,847, entitled "Method and Apparatus For Reconditioning Cylinder Heads", issued Jan. 1, 1974 to Kulzer, is directed to another manual alignment device.

SUMMARY OF THE INVENTION

Prior art cradles capable of movement about two orthogonal axes of rotation required manual manipulation, which was time consuming and error prone. Applicants' inventive cradle control system eliminates this time consuming and error prone human operation by electronically sensing when a valve guide is perpendicular to the ground.

A cylinder to be machined is secured to the cylinder head mount plate of the cradle, and two motors rotate the head mount plate about two orthogonal axes until a level sensor mounted to a valve guide which is inserted into the guide, indicates that the sensor is level, or that the valve guide is perpendicular to the plane defined by the ground.

BRIEF DESCRIPTION OF THE DRAWINGS

FIG. 7 is a detailed circuit schematic diagram of the analog portion of the circuitry (composed of FIGS. 7a and 7b);

DESCRIPTION OF THE PREFERRED EMBODIMENTS

Figure 1:
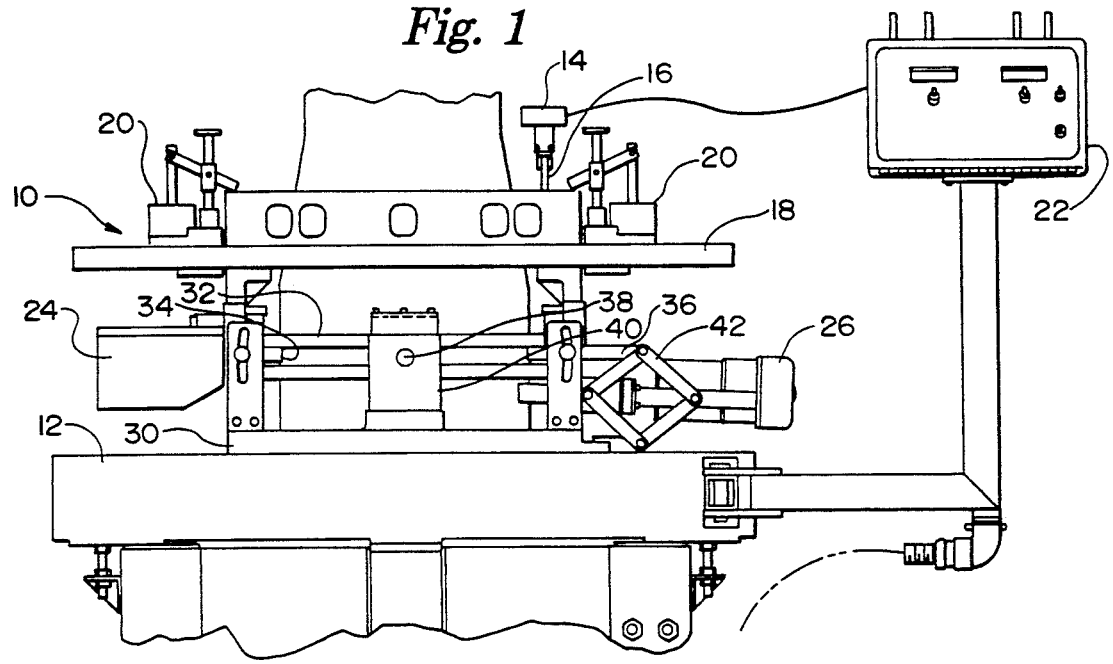
FIG. 1 is a front view of the inventive cradle resting on the working surface of a machining tool.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

Referring now to FIGS. 1 through 4, the inventive cradle is referred to generally as 10, and is shown resting on the working table 12 of an Seat & Guide machine manufactured by PCM Tech as model no. HMC-2000, which is a machining tool used for rebuilding the cylinder heads by boring out the valve seats and guides. As is well known in the art, the valve guide (not shown) of the cylinder must be aligned with the spindle of the machine used to bore out the valve seat and guides. The spindle of the machine used in the preferred embodiment has already been positioned perpendicular, or plumb relative to ground or earth.

In the preferred embodiment a pre-calibrated level sensor 14 is placed over valve guide pilot 16, which has been inserted into a guide (not shown). The cylinder head is securely attached to a cylinder head mount plate 18 using air clamps 20. Air clamps are well known in the art. The user initiates the automatic leveling via the control box 22, which contains most of the electronic control circuitry (discussed more fully below). The electronic control circuitry in control box 22 is electrically connected to the level sensor 14 and motors 24 and 26 (discussed more fully below). Motors 24 and 26 in the preferred embodiment are manufactured by W. W. Grainger motors model no. 4Z062A. As will be discussed more fully below, motors 24 and 26 manipulate the head mount plate 18 in two orthogonal directions, until the longitudinal axis defined by the level sensor 14 and the valve guide pilot 16 is perpendicular relative to earth. When this is accomplished, the axis of the pilot is plumb to earth, or parallel to the spindle of the machine which will be used to bore out the guide or seat. The boring machine provides the capability to move the entire cradle apparatus around on the tabletop once the guide has been aligned with the spindle of the machine. In this embodiment, air is used to float the cradle for ease of movement. It should be understood that the inventive cradle may be programmed to align the longitudinal axis of the guide with any arbitrary axis, as well as being used with other types of machines such as milling tools, surfacing machine etc.

Figure 2:
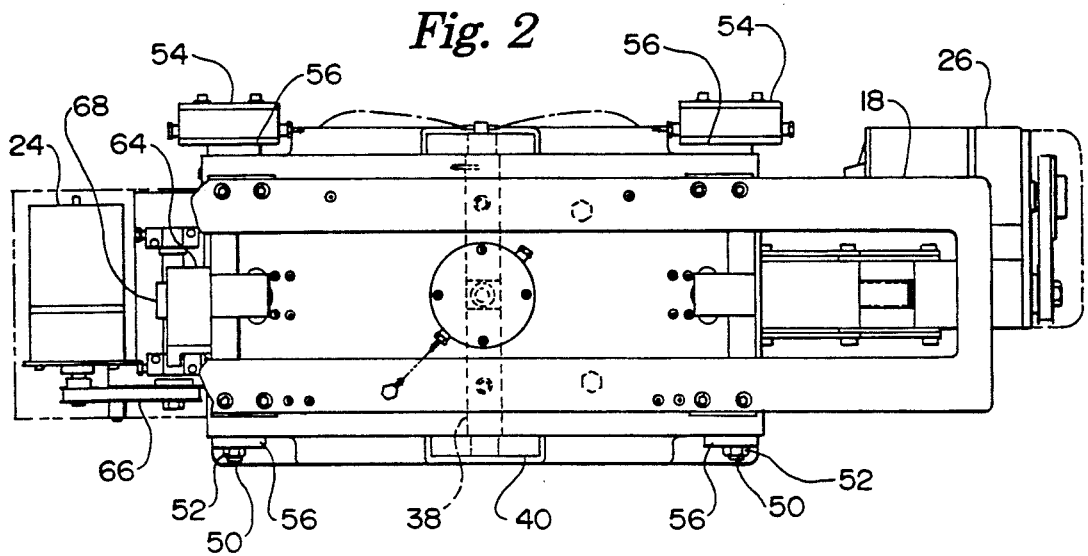
FIG. 2 is a top view of the inventive cradle with parts shown in silhouette.

As can be seen best in FIGS. 1 and 2, head mount plate 18 is a rectangular piece of metal with a center section removed. The air clamps 20 are sized to slidabley fit in the center section. The top and bottom surfaces of plate 18 are parallel and, in the preferred embodiment plate 18 is 1 ⅛ inches thick. Plate 18 may be easily adapted to secure any size of cylinder head, or other workpiece to be machined.

The cradle 10 rotates the head mount plate 18 in two orthogonal directions, defined as the "X" or longitudinal and the "Y" or rollover directions. Base plate 30 provides a support for the various components of the cradle 10, and provides a convenient reference for the "X" and "Y" coordinate system. The head mount plate 18 can be rotated in the "X" or longitudinal direction using intermediate plate 32, which is mounted on intermediate plate supports 34 and 36. Intermediate plate 32 rests on a square pivot rod 38 (best shown in FIG. 2) which has rounded ends and pivots in pivot block 40. Intermediate plate support 36 is connected to a screw jack 42 which raises and lowers intermediate plate support 36 relative to base plate 30, thereby causing the intermediate plate 32 to pivot about the longitudinal axis of pivot rod 38. As is well known in the art, the drive belt and sheaves 44 of motor 26, in combination with leadscrew nut 46 and threaded leadscrew 48, compress and expand screw jack 42, which in turn raises and lowers intermediate plate support 36. In the preferred embodiment, the pivot rod 38 is mounted so that it is parallel to the plane defined by base support 30.

Figure 3:
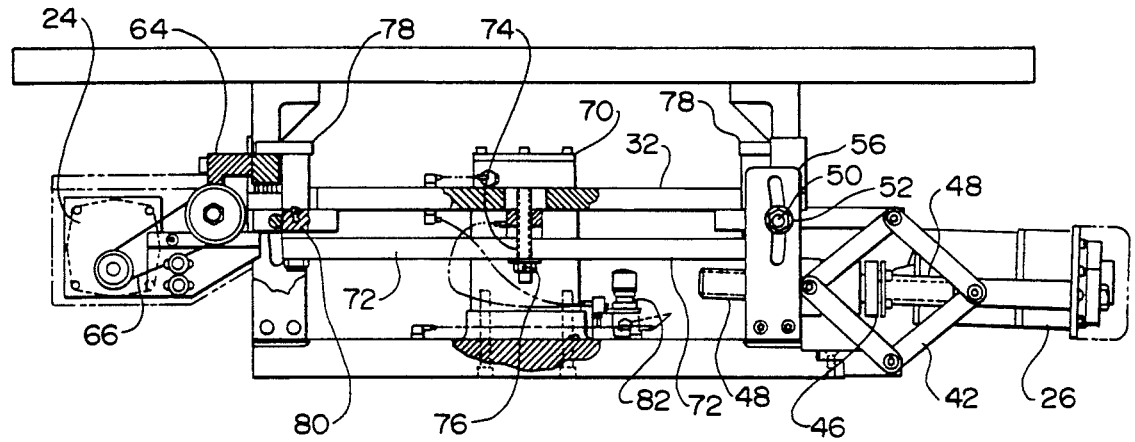
FIG. 3 is a front view of the inventive cradle with parts cut-away.

The intermediate plate may be clamped into a locking position by means of clamp rods 50, clamp rod nuts 52, pneumatic air clamp cylinders 54 and longitudinal clamps 56 (best shown in FIG. 2), as is well known in the art. As shown in FIG. 3, longitudinal clamps 56 are provided with slots to allow for rotation of the intermediate plate 32 around the longitudinal axis of pivot rod 38. Clamp cylinders 54 tightens clamp rod nuts 52 against clamps 56, thereby preventing any further rotation of the intermediate plate 32.

The "Y" axis movement is all mounted on the intermediate plate 32, and the head mount plate 18 is connected to the "Y" axis movement apparatus. Therefore, it can be seen that when the intermediate plate 32 pivots around the longitudinal axis of pivot rod 38, the entire head mount plate 18 rotates around that same longitudinal axis.

Figure 4:
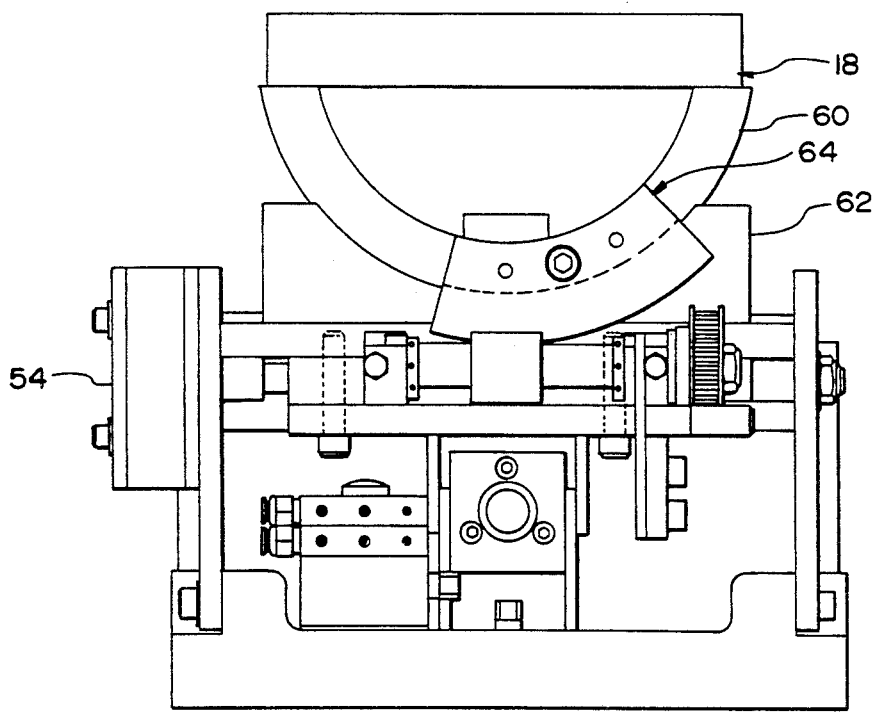
FIG. 4 is a left end view of FIG. 1.
Figure 5A:
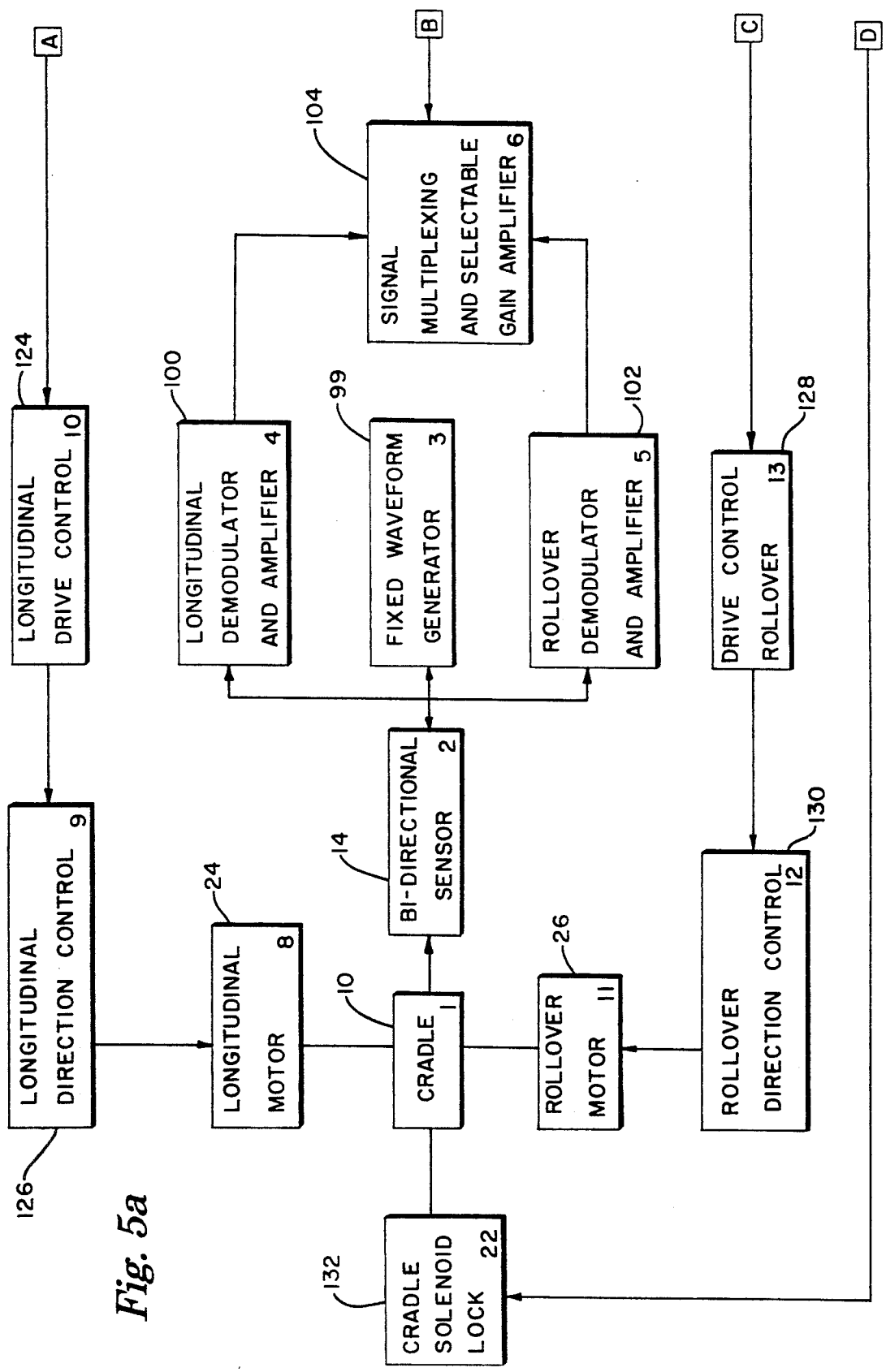
FIG. 5 is a generalized block diagram of the circuitry used to control the cradle.

The "Y" axis movement apparatus can best be seen with reference to FIGS. 3 and 4. A pair of arcuate supports 60 support head mount platform 18. Supports 60 rest in shoes 62. The "Y" axis or rollover rotation of head mount platform 18 is performed using a worm gear arrangement. Worm gears are well known in the art. Motor 24 drives a belt and sheaves 66, which in turn rotates a worm 68, which moves a worm gear 64, causing the head mount plate 18 to move forward or backward in the "Y" direction. In the preferred embodiment, the head mount plate 18 is mounted on supports 60 such that the "Y" axis of rotation is 3/4 of an inch from the bottom of head mount plate 18, and is located coextensive with the line which divides the head mount plate into two long halves. For purposes of definition, a plane parallel to the top and bottom surfaces of the head mount plate 18, which contains the "Y" axis rotation axis will be called the working plane. As the worm gear 64 causes the supports 60 to rotate in shoes 62, the working plane is rotated about the "Y" axis of rotation. It should also be noted that in the preferred embodiment, the head mount plate 18 is mounted such that the line which divides the head mount plate 18 into two short halves is directly above the "X" axis rotation axis. A plane defined by these two axis would be perpendicular to both the base plate 30 and the head mount plate 18.

A clamp mechanism is also used to lock the "Y" axis rotation mechanism in place once proper orientation of the workpiece is achieved. A pneumatic air cylinder 70 is attached to the upper portion of the intermediate plate 32. Clamp bars 72 are attached to a clamp rod 74 with a clamp rod nut 76. When the clamp 70 is activated, clamp rods 72 are pulled upwardly, which applies a downward pressure on clamps 78, which in turn halts the worm gear 64 in place.

Clamps 54 can be adjusted by tightening or loosening clamp rod nuts 52. Clamp 70 can be adjusted similarly using clamp rod nut 76. To adjust the clamp rods 72 eccentric pins 80 may be used.

A vacuum pump (not shown) is used to increase the effective weight of the cradle by reducing the pressure in a cavity milled into the lower plate 30, below atmospheric. Machine shop air supply is used to float the cradle on the working surface 12. Flow control valve 82 is used to adjust the supply of air to prevent "bounce" of the cradle.

An alternative use for the inventive cradle would be for use in connection with a surfacing machine for leveling the cylinder head, as is well known in the art. The sensor is modified so that the bottom portion of the sensor defines a plane which is perpendicular to the longitudinal axis referred to above. The sensor is then placed on the cylinder head and the cradle manipulates the head mount plate until the cylinder head is parallel to the ground, so that the surface leveler machine can level the cylinder head.

Figures 1, 6A:
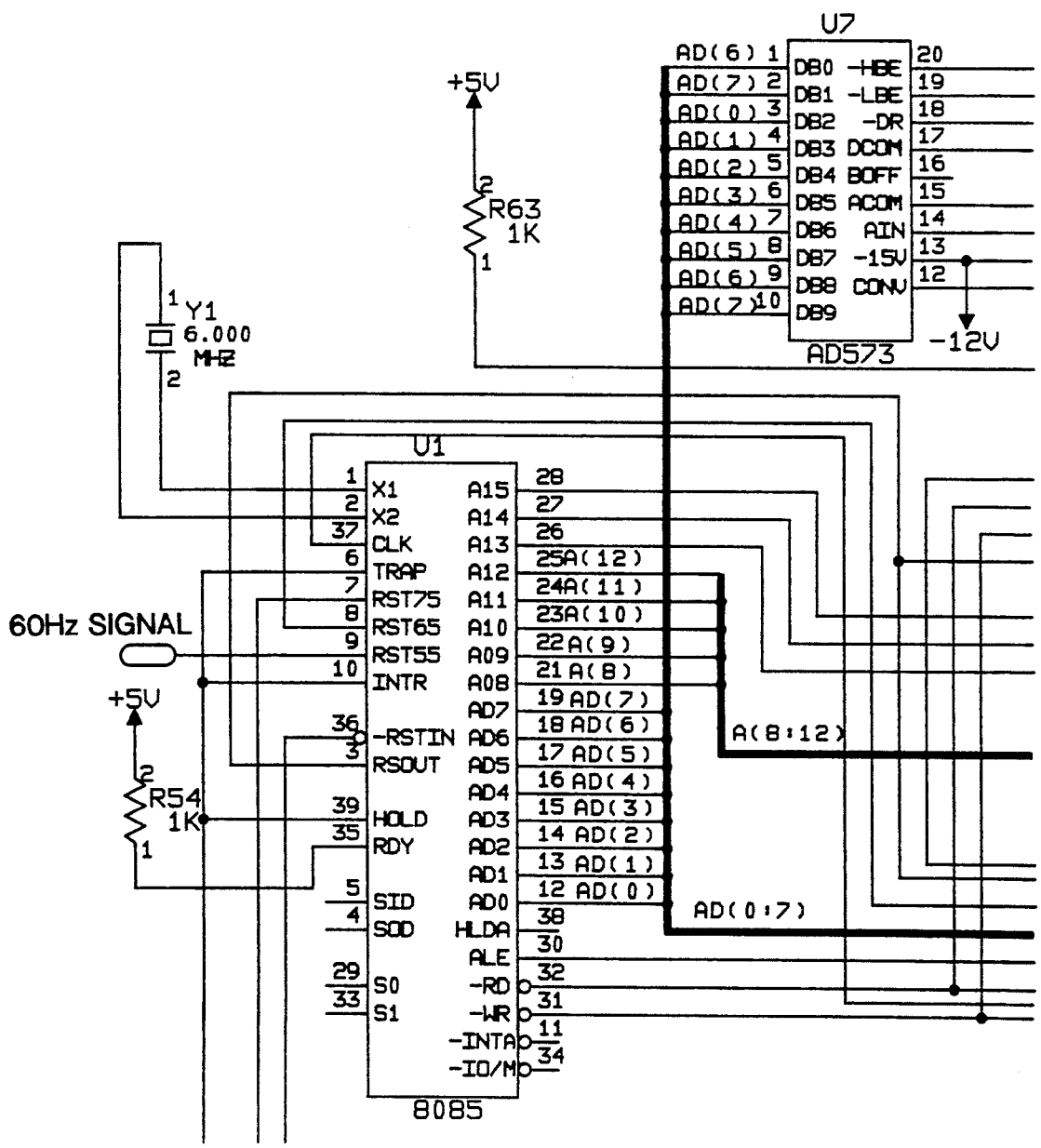
Figures 2, 6A:
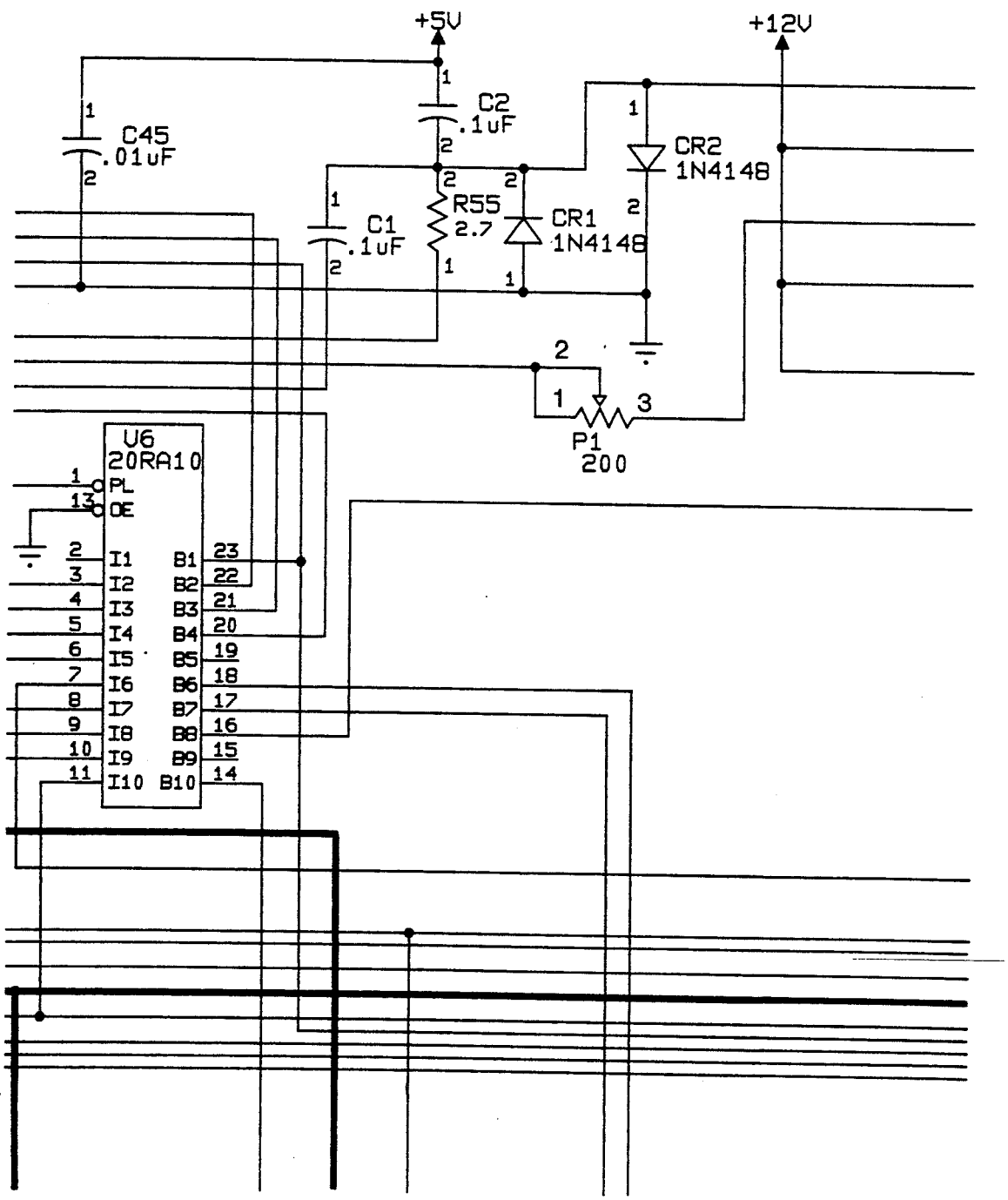
Figures 3, 6A:
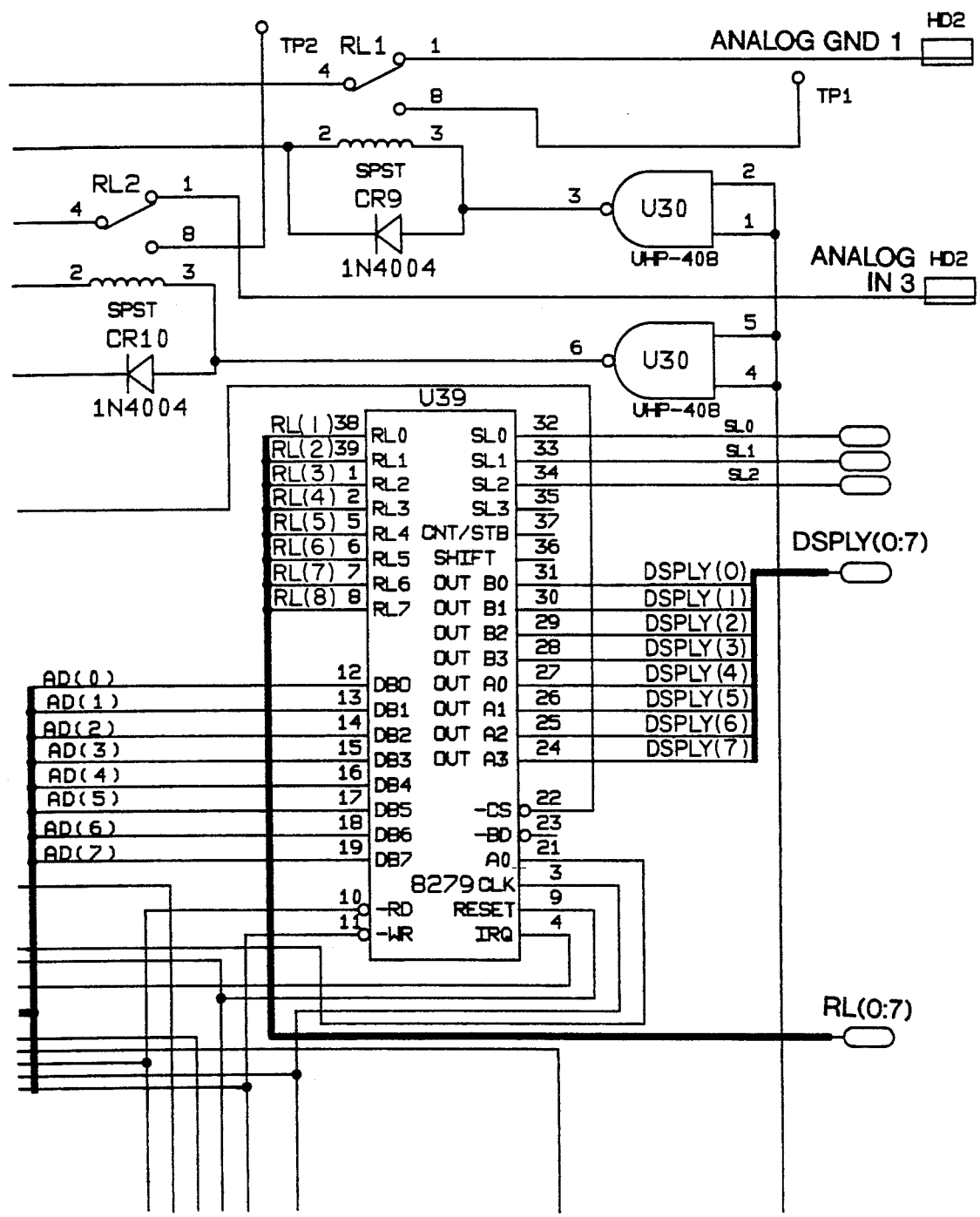
Figures 4, 6A:
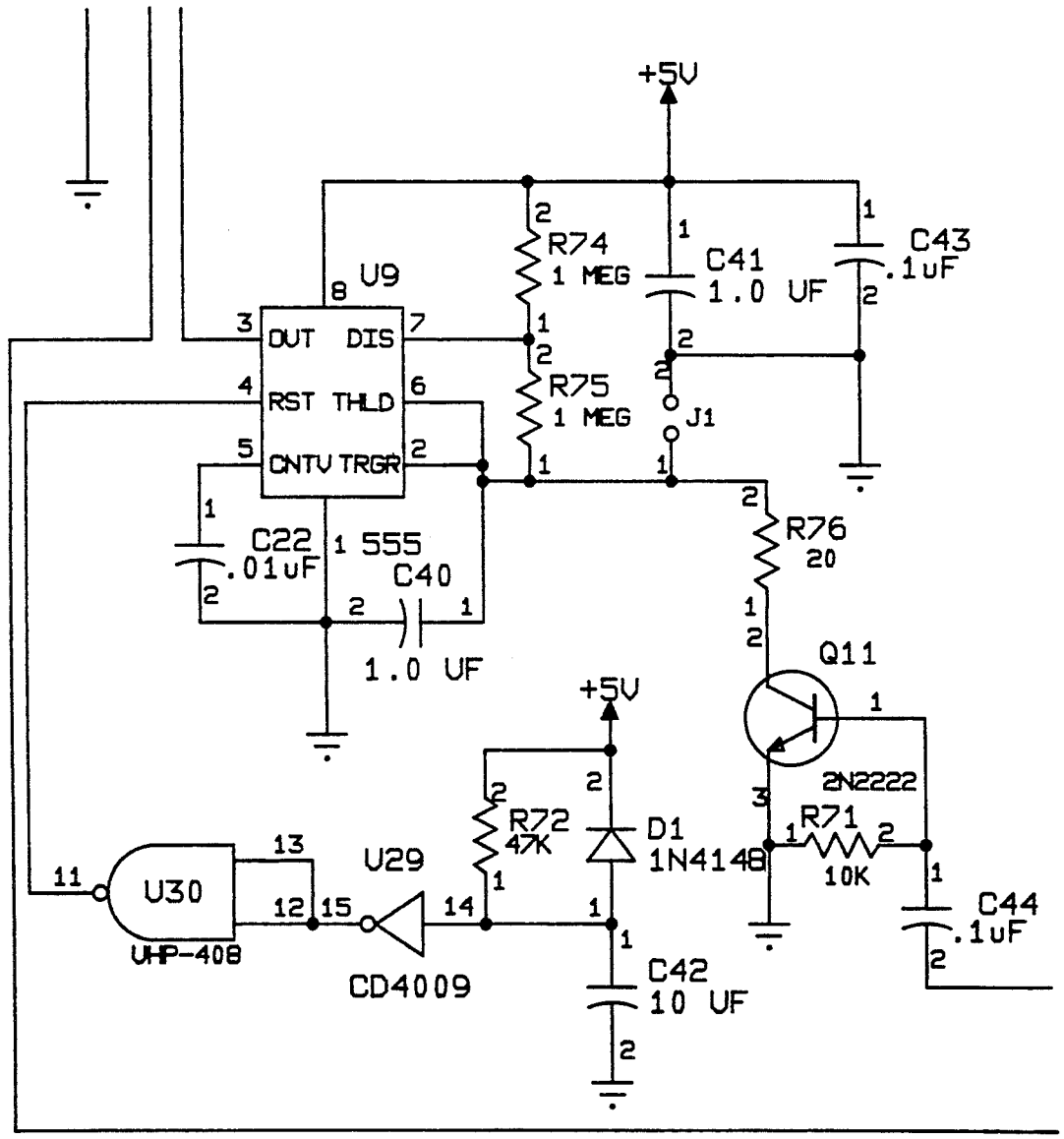
Figures 5, 6A:
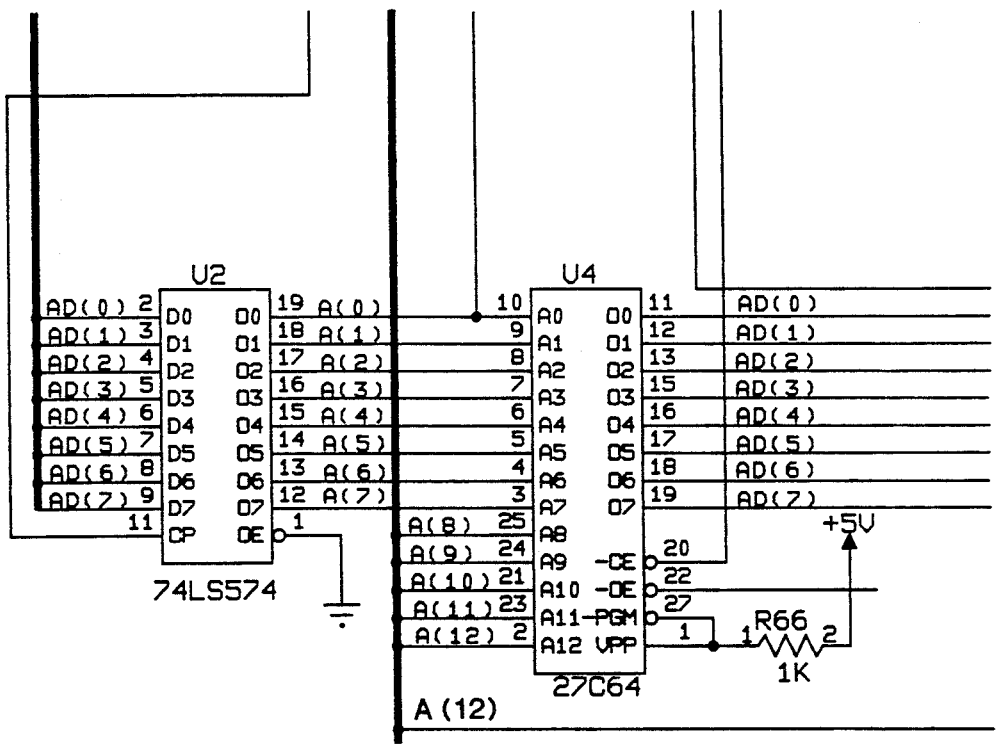
Figures 6, 6A:
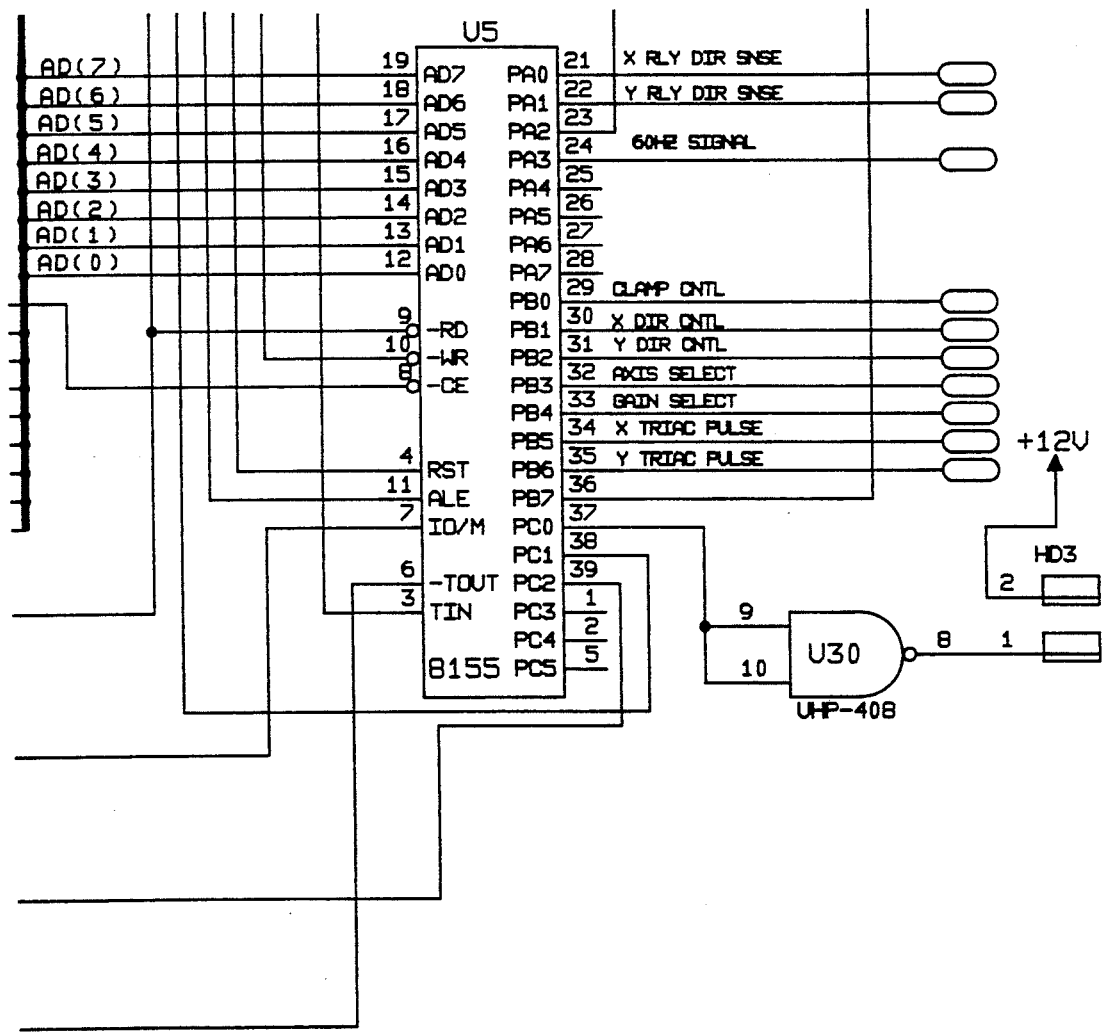
FIG. 6 is a detailed circuit schematic diagram of the digital portion of the circuitry (composed of FIGS. 6a-6d)

Turning our attention now to the electronic circuitry used to operate and control the automatically leveling cradle 10, FIG. 5 shows a generalized block diagram of the cradle apparatus and the corresponding electronic circuitry used to operate and control it. Corresponding detailed schematic diagrams of portions of this circuitry are shown in FIGS. 6-8. In lieu of describing the invention's operation relative to the detailed circuitry, the following description will proceed with respect to the generalized block diagram of FIG. 5, with periodic mention, as necessary, to the corresponding detailed circuitry of FIGS. 6-8.

Referring now to FIG. 5, the workpiece cradle is shown at 10, as discussed above. Two AC induction motors 24 and 26 are used to move the cradle head mount plate 18 in the "X" and "Y" axes direction, as discussed above. The bi-directional sensor is shown at 14. As discussed above, the sensor 14 is placed on the valve guide 16 so that the axis of the sensor is coextensive with the axis of the guide. The electronic positioning information received from the sensor 14 is processed by the circuitry discussed below, and the motors 24 and 26 are energized to manipulate the head mount plate 18 until the guide axis is perpendicular or plumb relative to earth. A fixed waveform, generated by fixed waveform generator 99, is applied to the sensor 14. The impedance type sensor provides a signal to both the longitudinal demodulator 100 and the rollover demodulator 102. Each demodulator 100 and 102 can detect the presence of either constructive or destructive interference of sensor 14 waveforms. The outputs of the demodulators are inputs to block 104, where the two signals are multiplexed and amplified. This analog signal is converted to a digital signal via block 106. The digital interface block 108 handles signals to and from the microprocessor, shown at block 110. Based on the input from sensor 14, the microprocessor 110 directs the motor controls to manipulate head mount plate 18 until the sensor is leveled, which in turn means that the longitudinal axis of the valve guide 16 is perpendicular to ground, or parallel to the spindle of the machine used to bore out the valve seat. The microprocessor also manages the panel and pulse switches, shown at block 112, which allow the operator to manually control the cradle movement, start the auto leveling cycle, and provide access to special features of the Auto Leveler 10. A digital display, shown at 114, is also included for ease of interfacing with the operator. The 60 Hz signal detector block, shown at 116, is a square wave which is input to the microprocessor 110, and is used in triggering the triacs (discussed below) to control the motors 24 and 26, via blocks 124; 126; 128, and 130. The watchdog circuit, shown as block 118, acts to protect from runaway control. Blocks 120 and 122 refer respectively to control circuitry and their related buffers. Once the cradle is in position, the air solenoid control, shown as block 132, is used to lock the workpiece in position.

It should be noted that many different types of motors and gear arrangements could be used as alternates to those described in the preferred embodiment.

Referring now to FIG. 6a, the microprocessor, shown at U1, is an Intel 8085; the microprocessor memory is shown at U4; the system decoding is shown at U6 and is a programmable logic device (PAL). The PAL U6 decodes signals for the memory U4, the analog to digital converter U7, the digital display and switch control circuitry and the digital buffers. The transistor Q11 and the 555 timer U9 provide an edge triggered watchdog circuit (see block 20 in FIG. 5) to protect from runaway control. U7 and its related components convert the analog signal to a digital signal. U5 provides control logic signals (see block 16 in FIG. 5).

Figures 1, 6B:
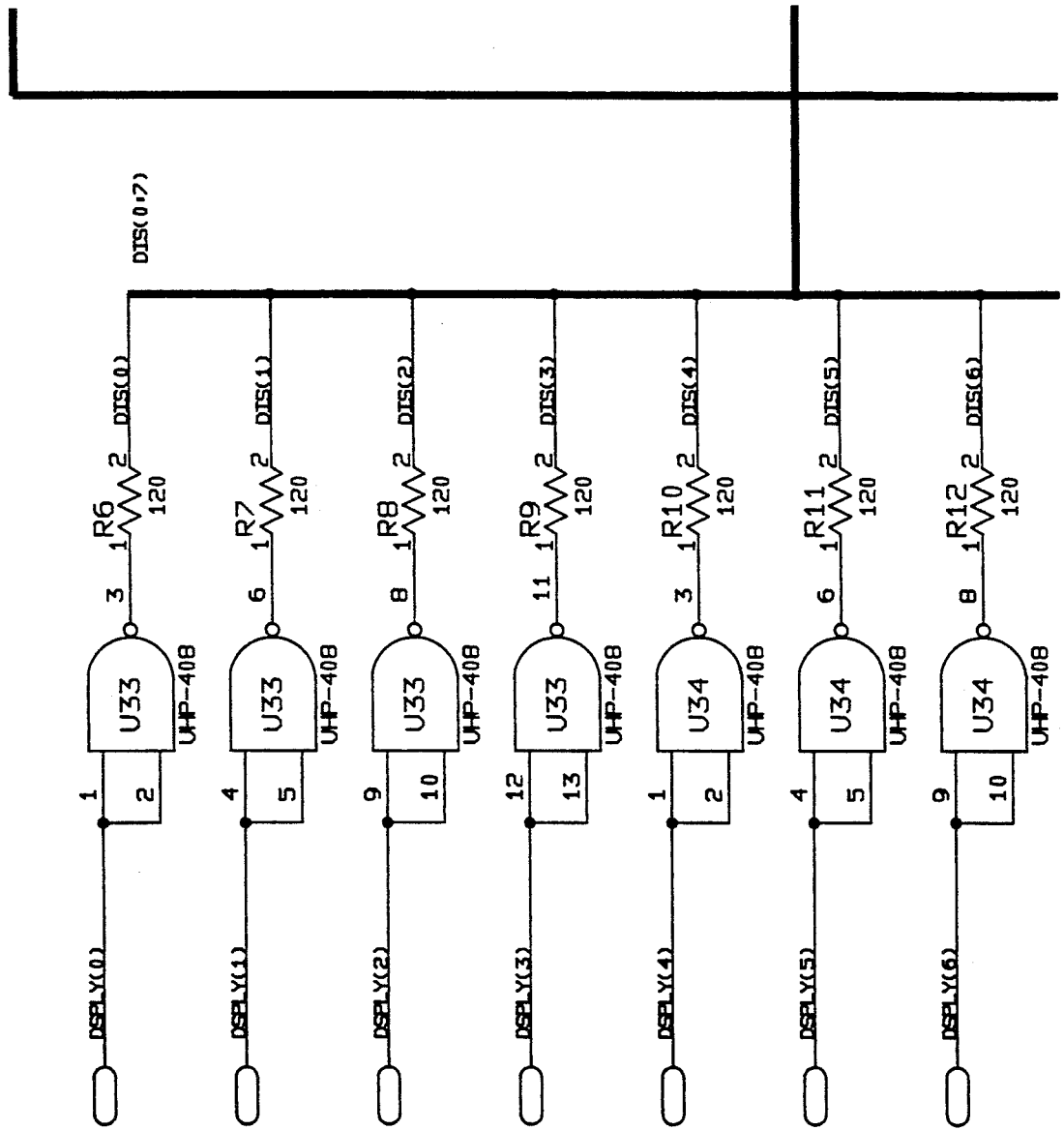
Figures 2, 6B:
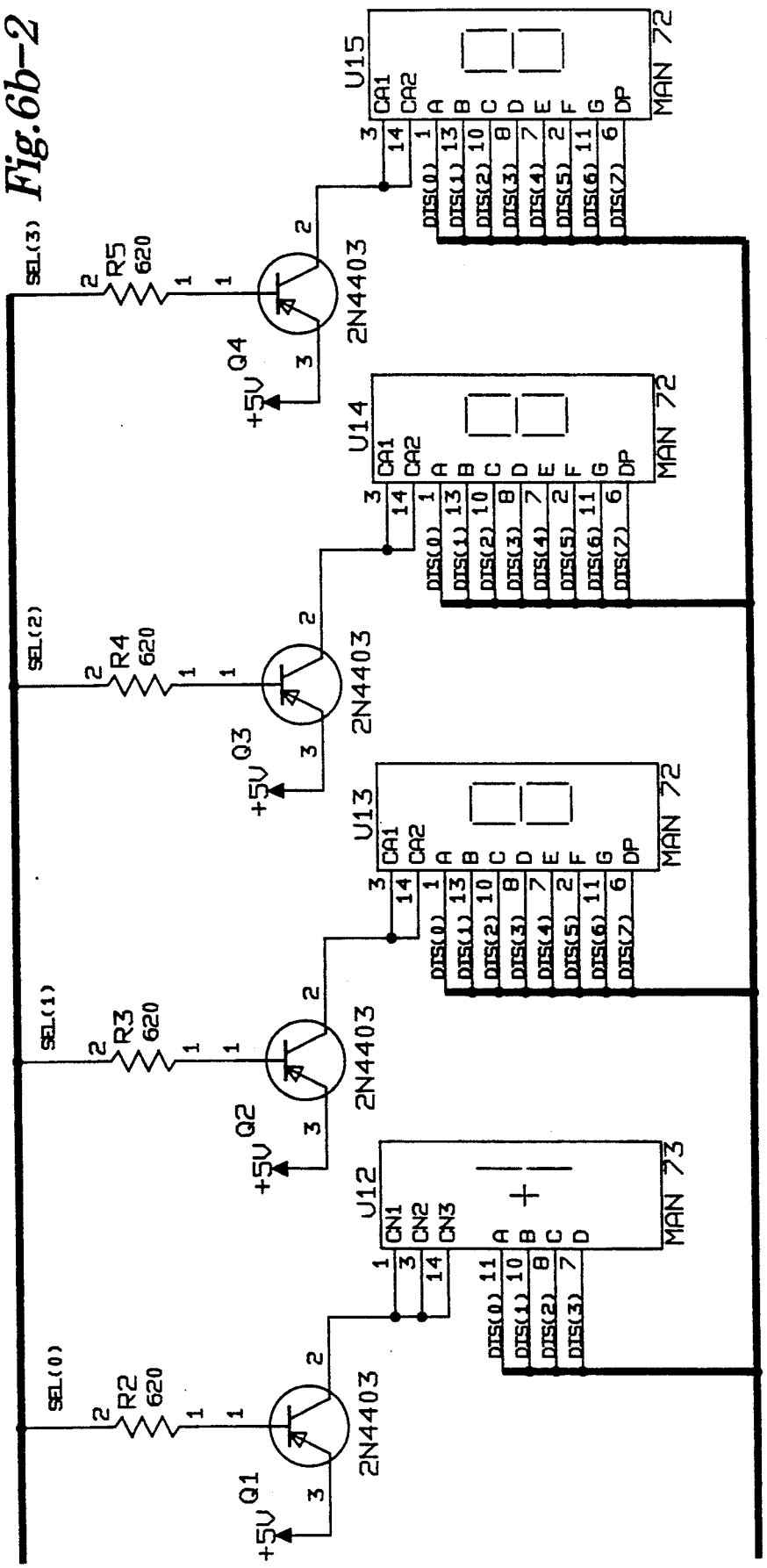
Figures 3, 6B:
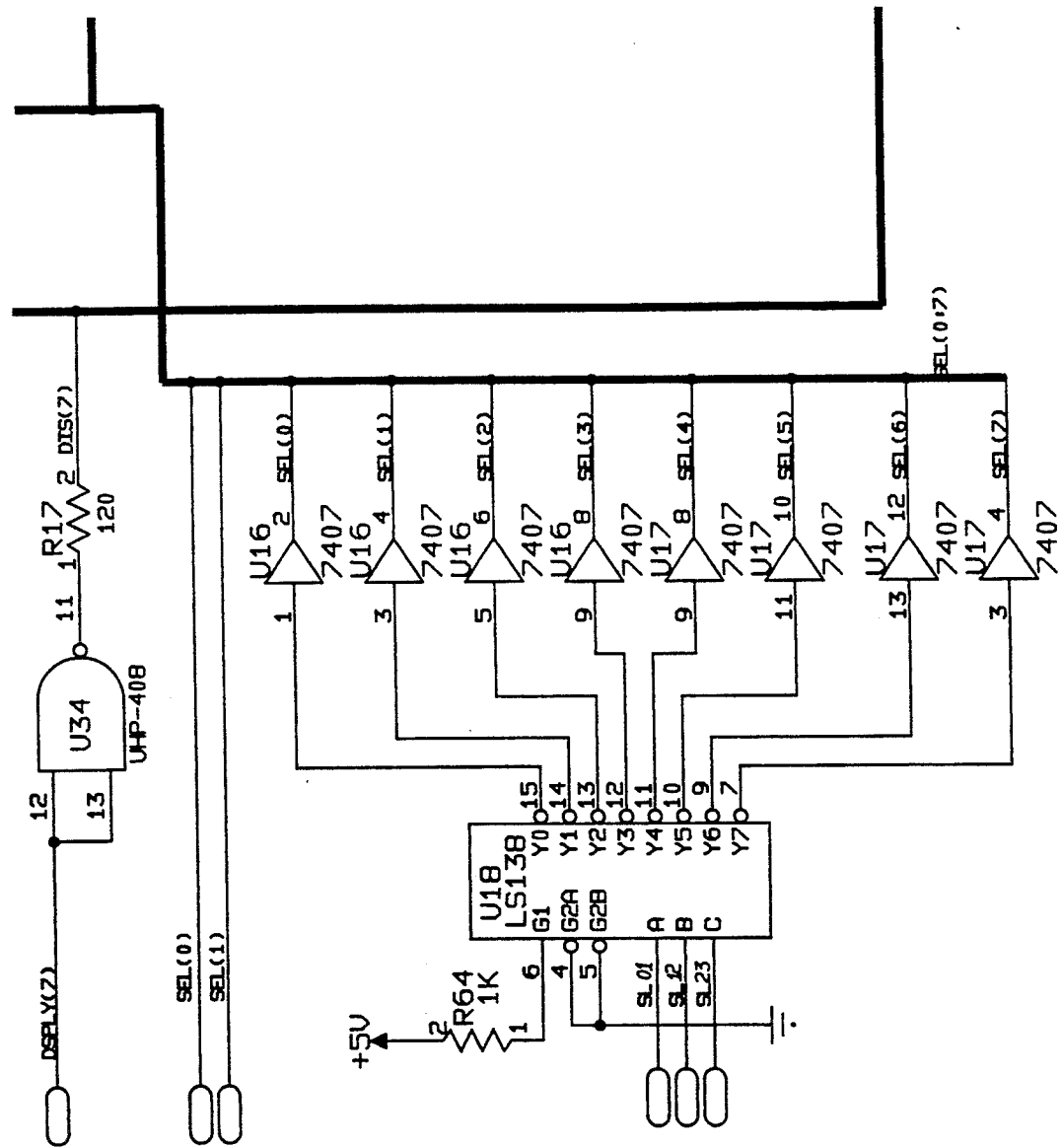
Figures 4, 6B:
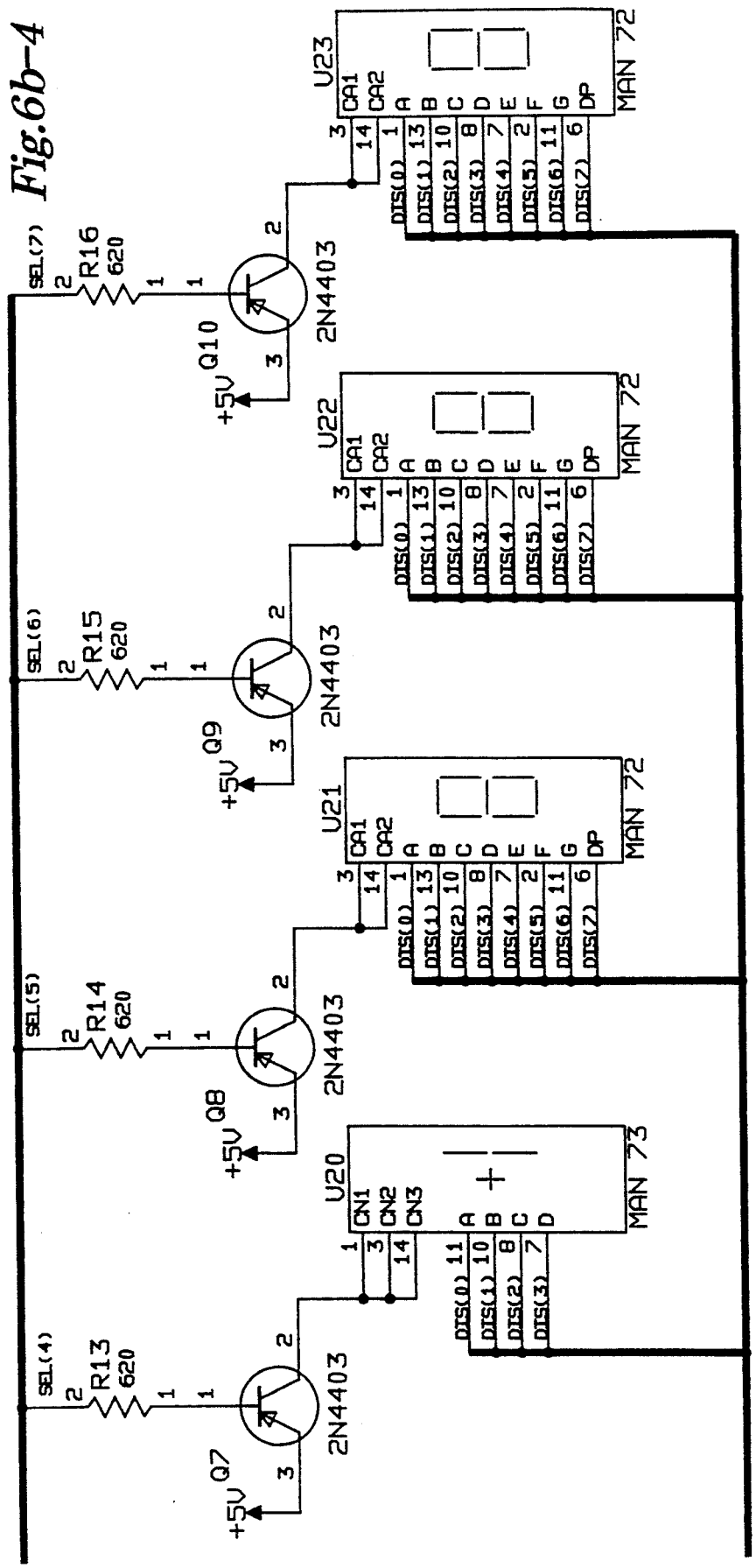
Figures 2, 6C:
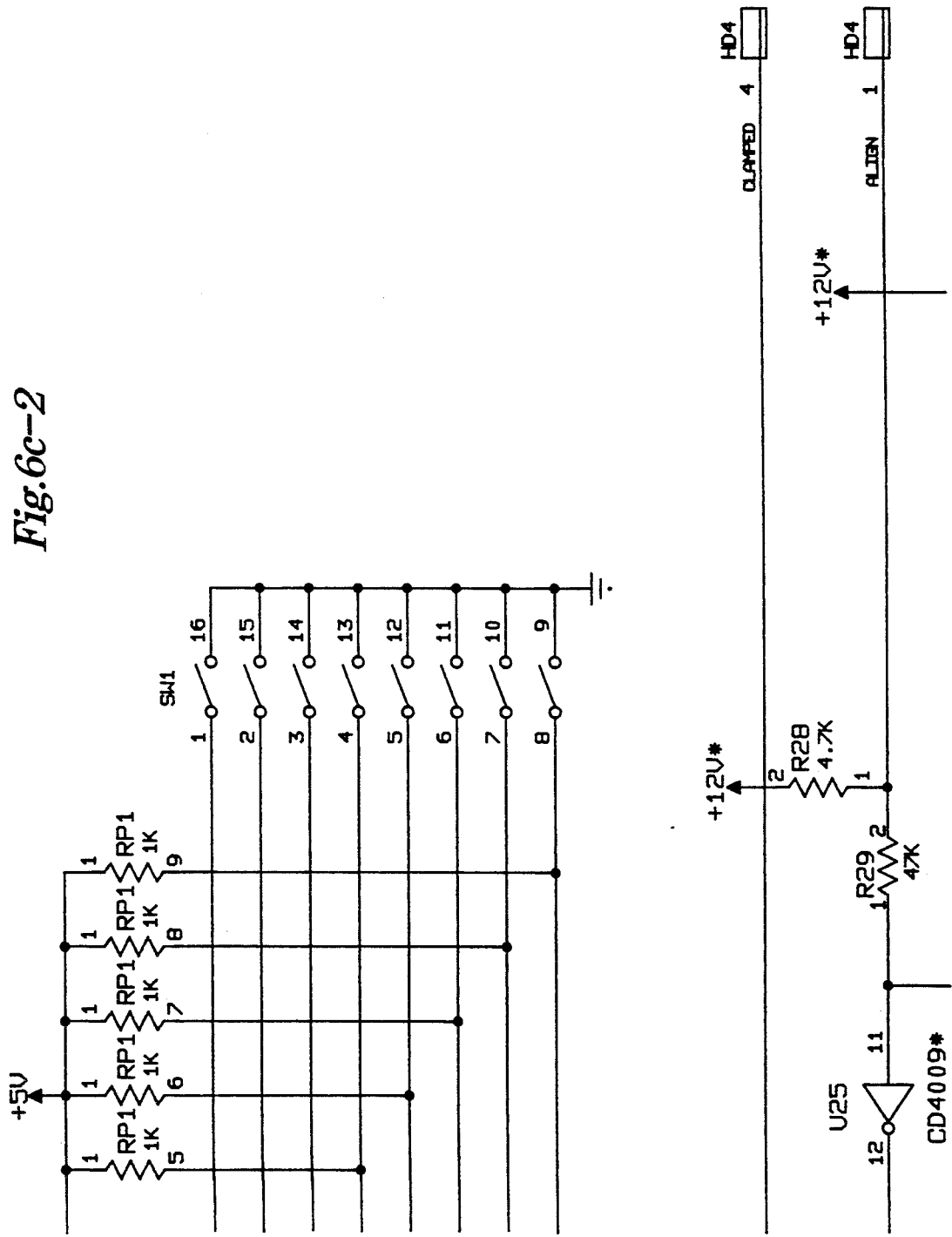
Figures 4, 6C:
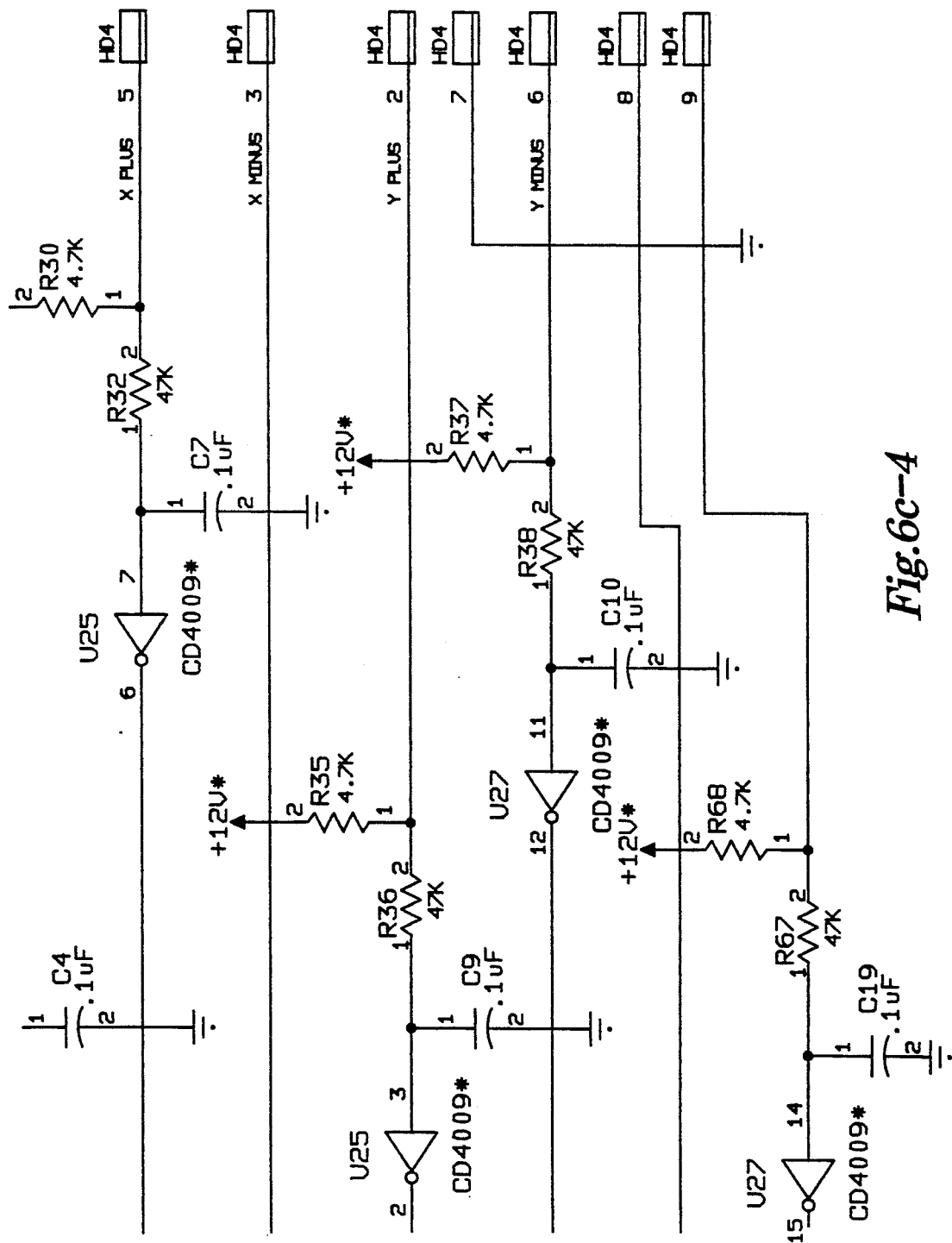
Figures 1, 6D:
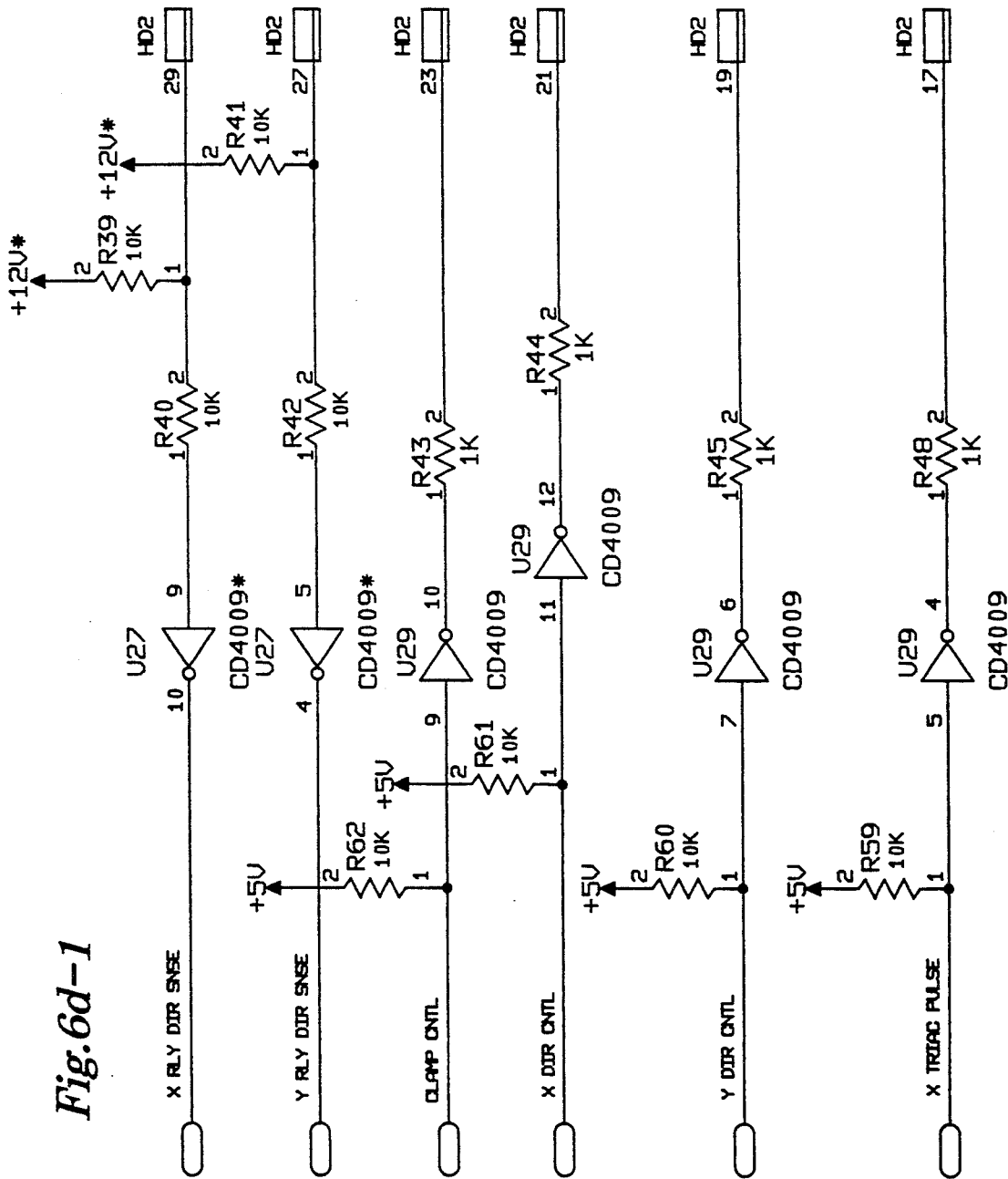
Figures 2, 6D:
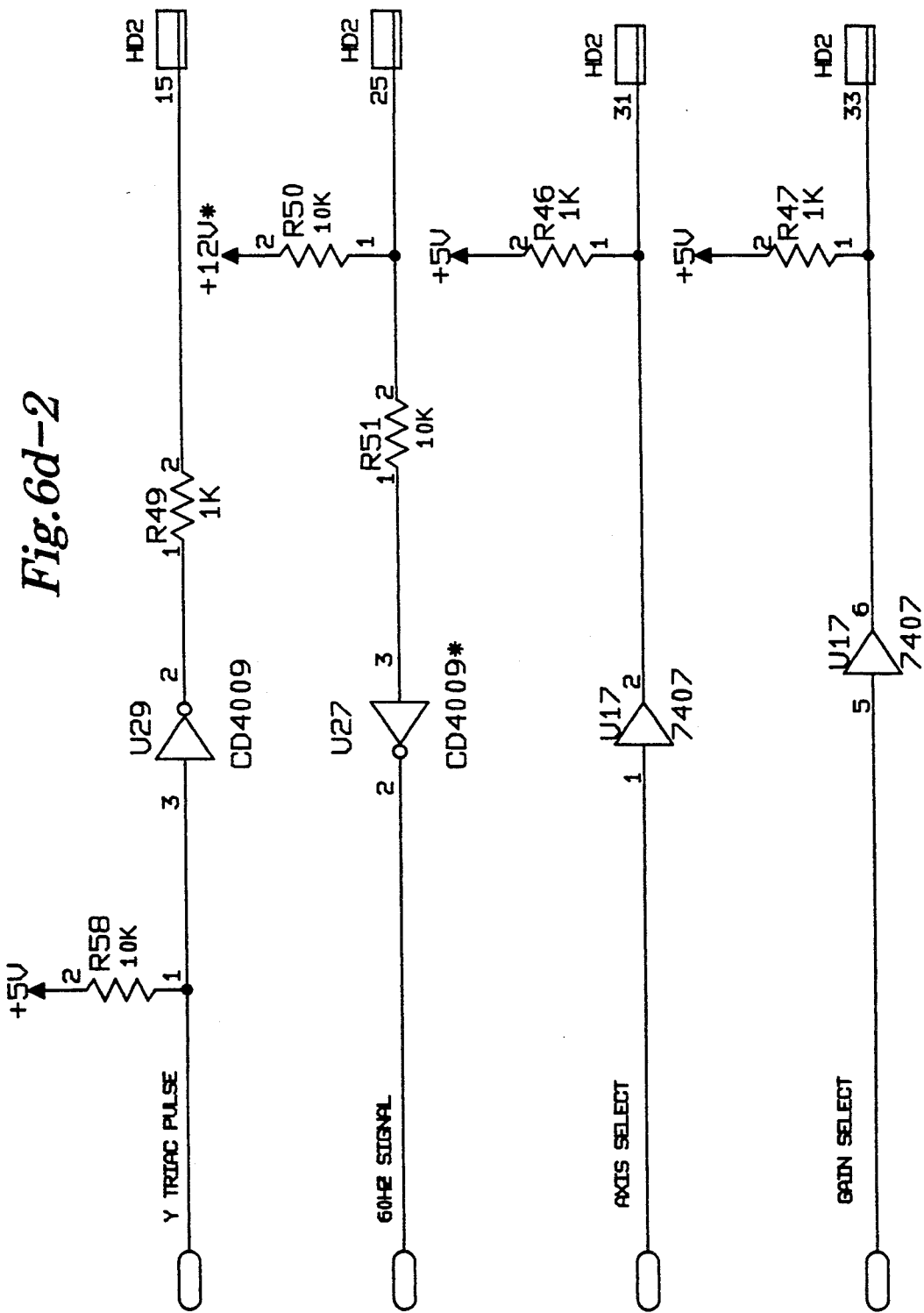

Referring now to FIG. 6b, the circuitry relating to the digital display of the auto leveler is shown. The front panel display consists of 8 LED displays. Each display is selected by select lines SL0-SL2 (inputs to U18). Then DSPLY(0)-DSPLY(7) will turn on one segment of the selected display. This flash pattern is repeated for each display turning on or off each one of the segments. Four switches are also located on the front panel and are connected via HD4 (see FIG. 6c). These switches control manual movement of the cradle 10 and the auto level functions. FIG. 6c also shows 8 dip switches. These switches are used to control the number of pulses supplied to the motor driver control. These DIP switches, the panel switches, and the display output are all channelled through circuit element U39 (see FIG. 6a), which is an 8979. The microprocessor U1 detects changes in the switch settings and controls the display via U39, as is well known in the art.

Figures 1, 7A:
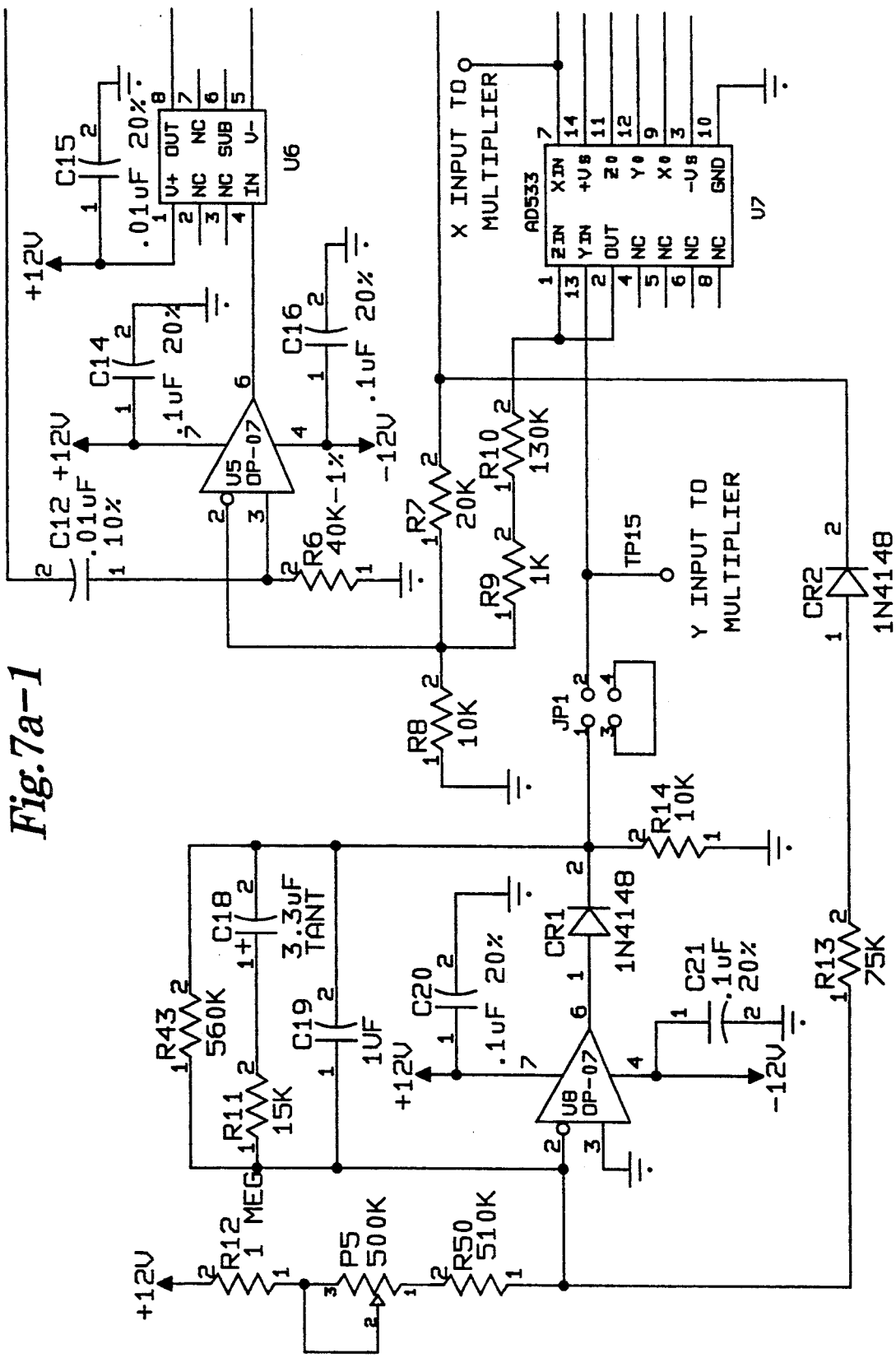
Figures 2, 7A:
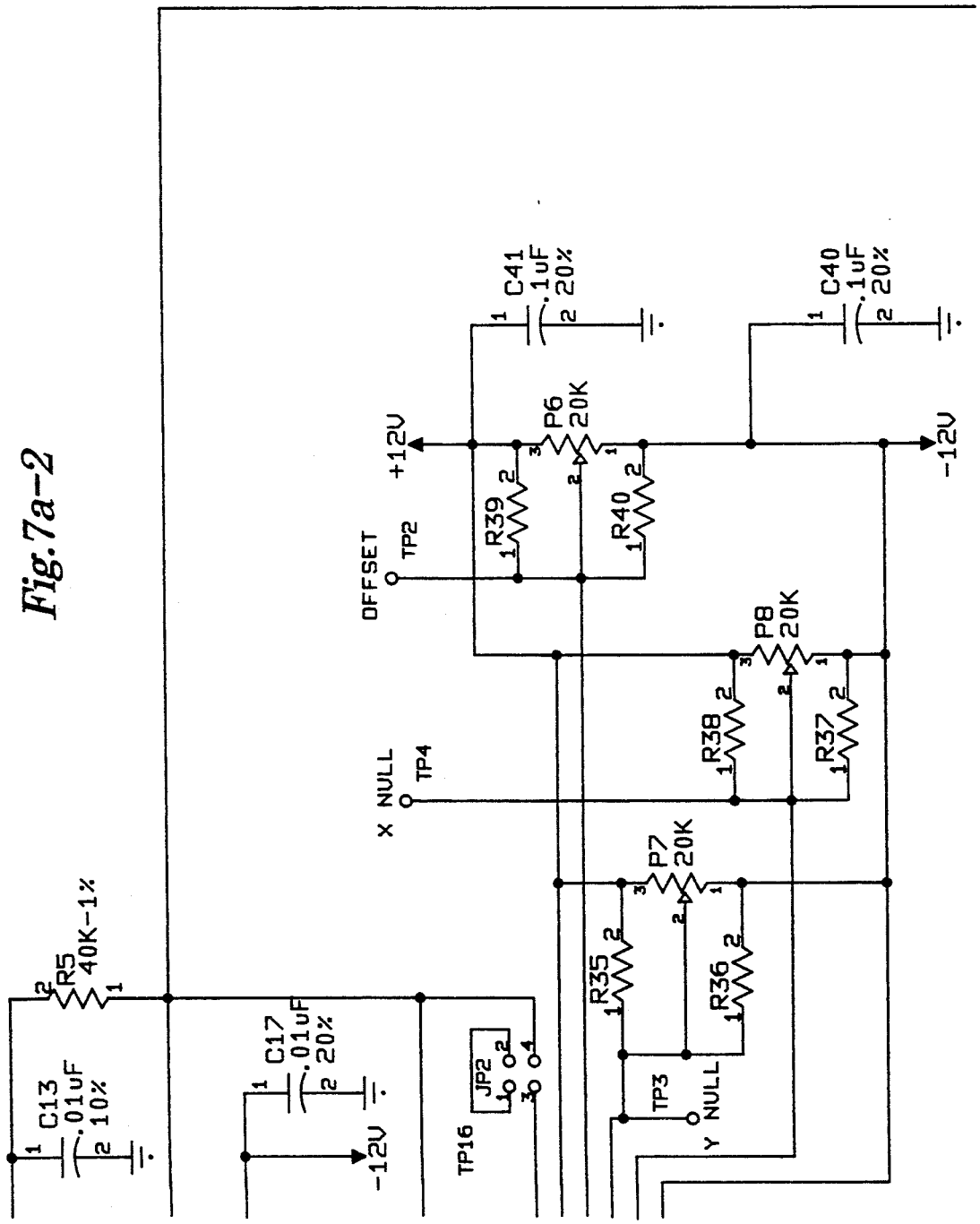
Figures 3, 7A:
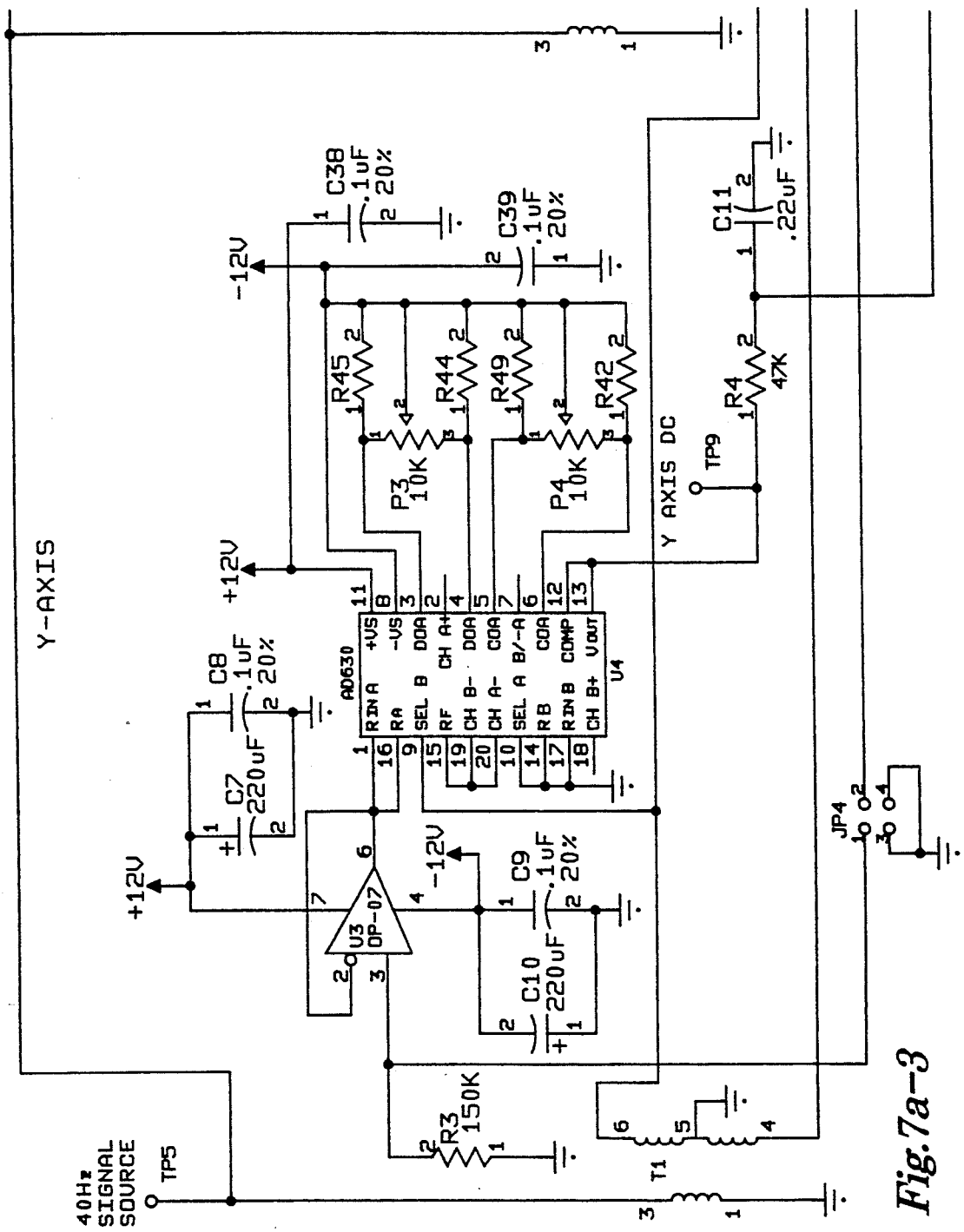
Figures 4, 7A:
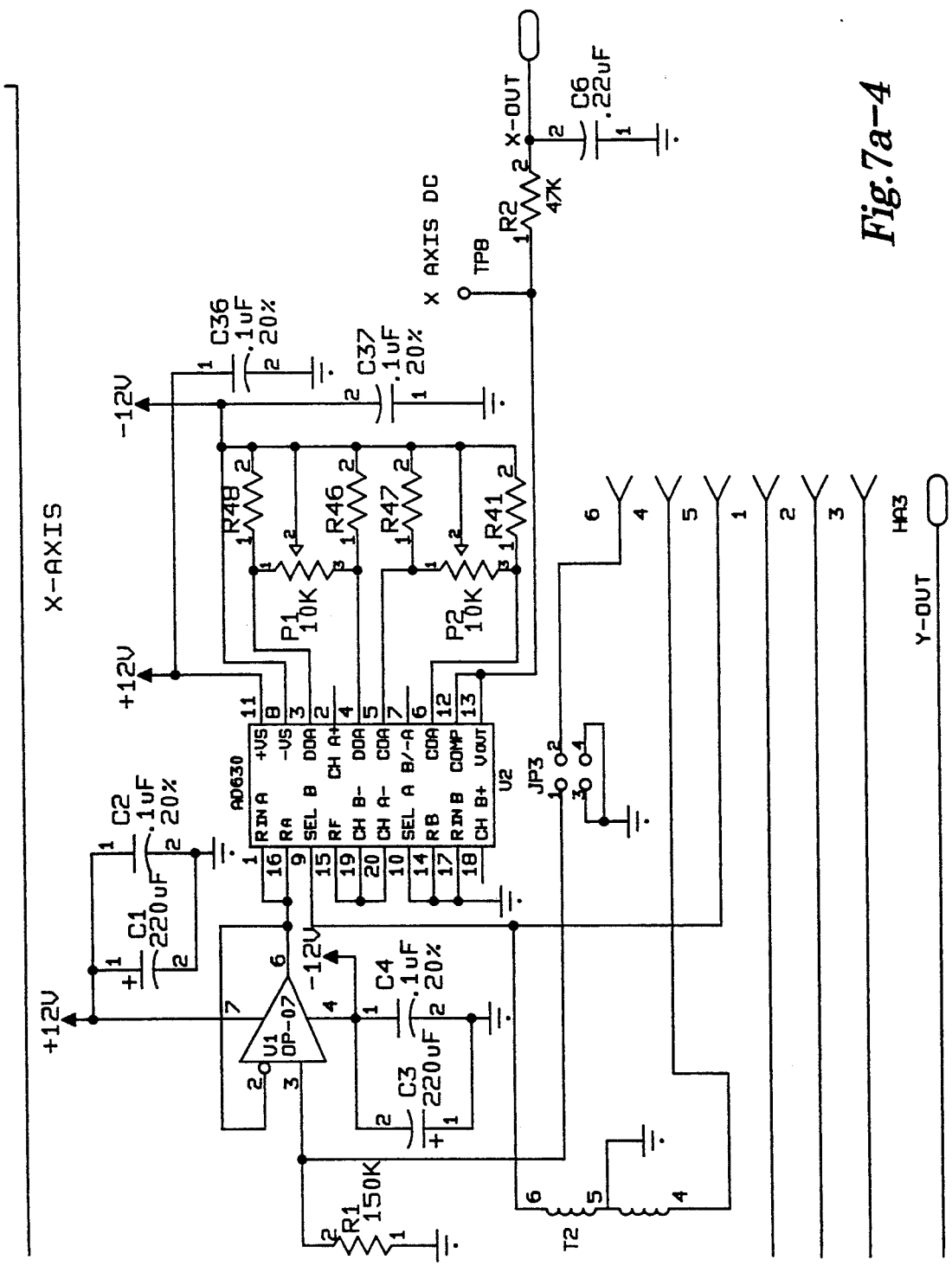
Figures 1, 7B:
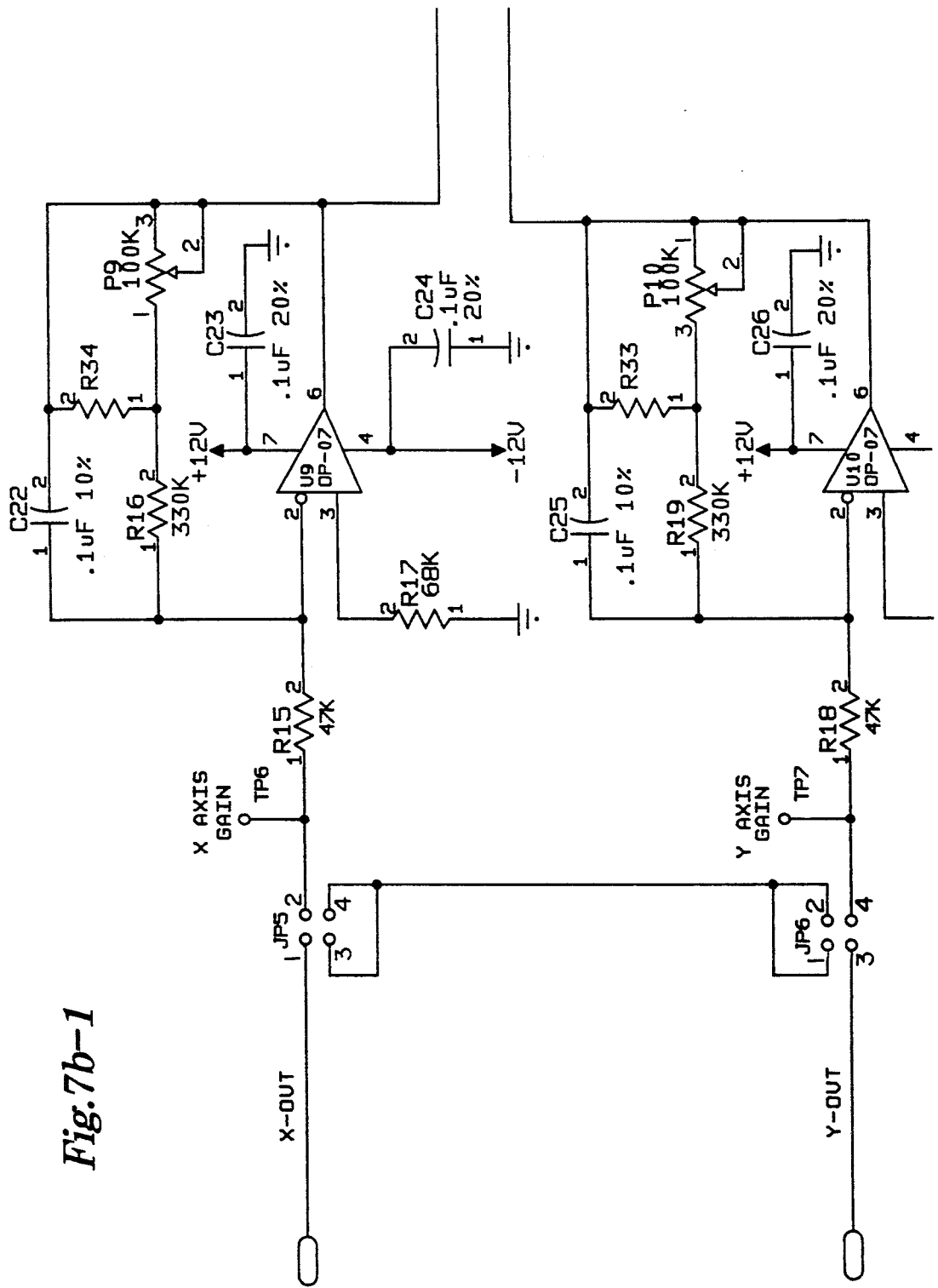
Figures 2, 7B:
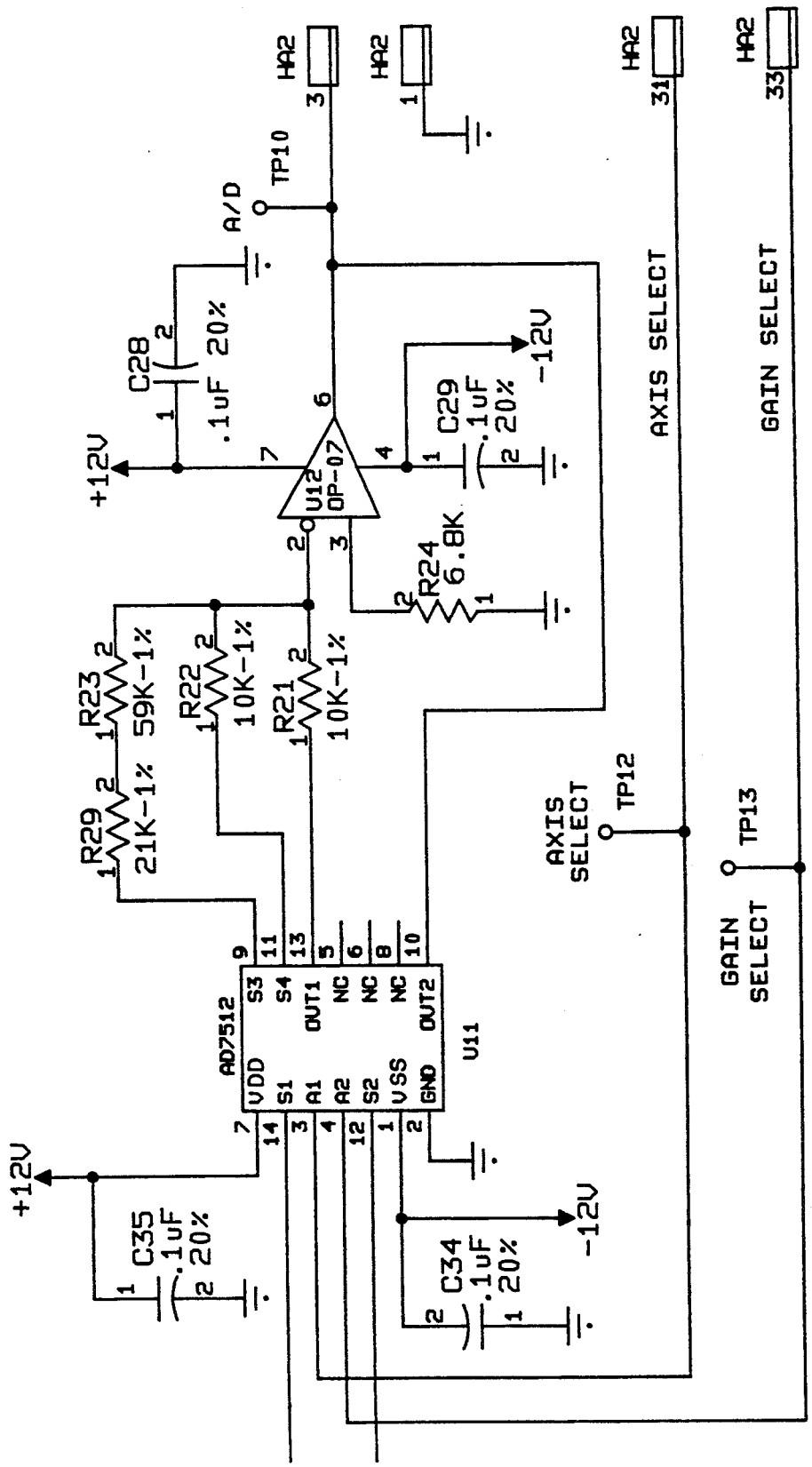
Figures 3, 7B:
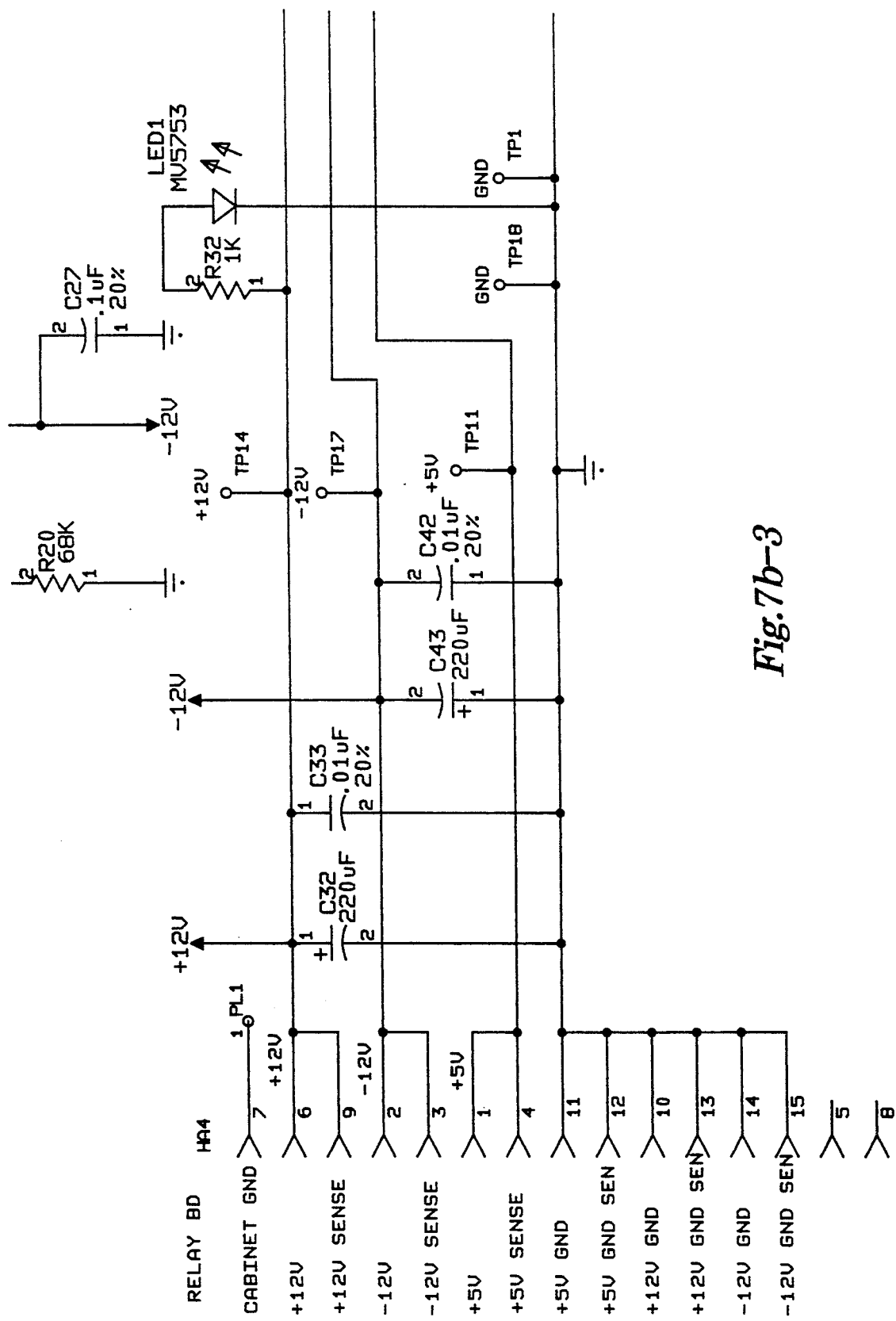
Figures 4, 7B:
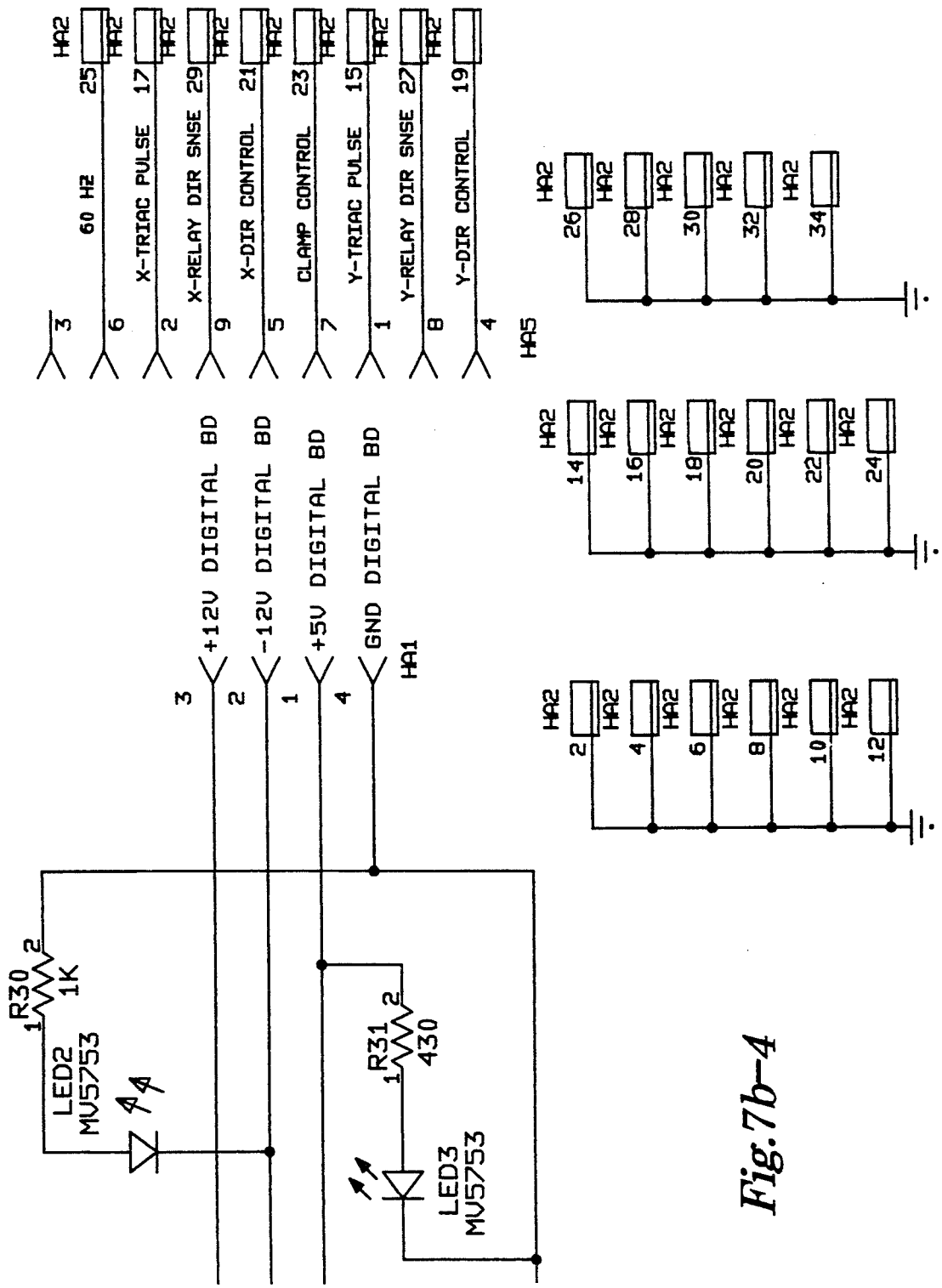
Figure 8A:
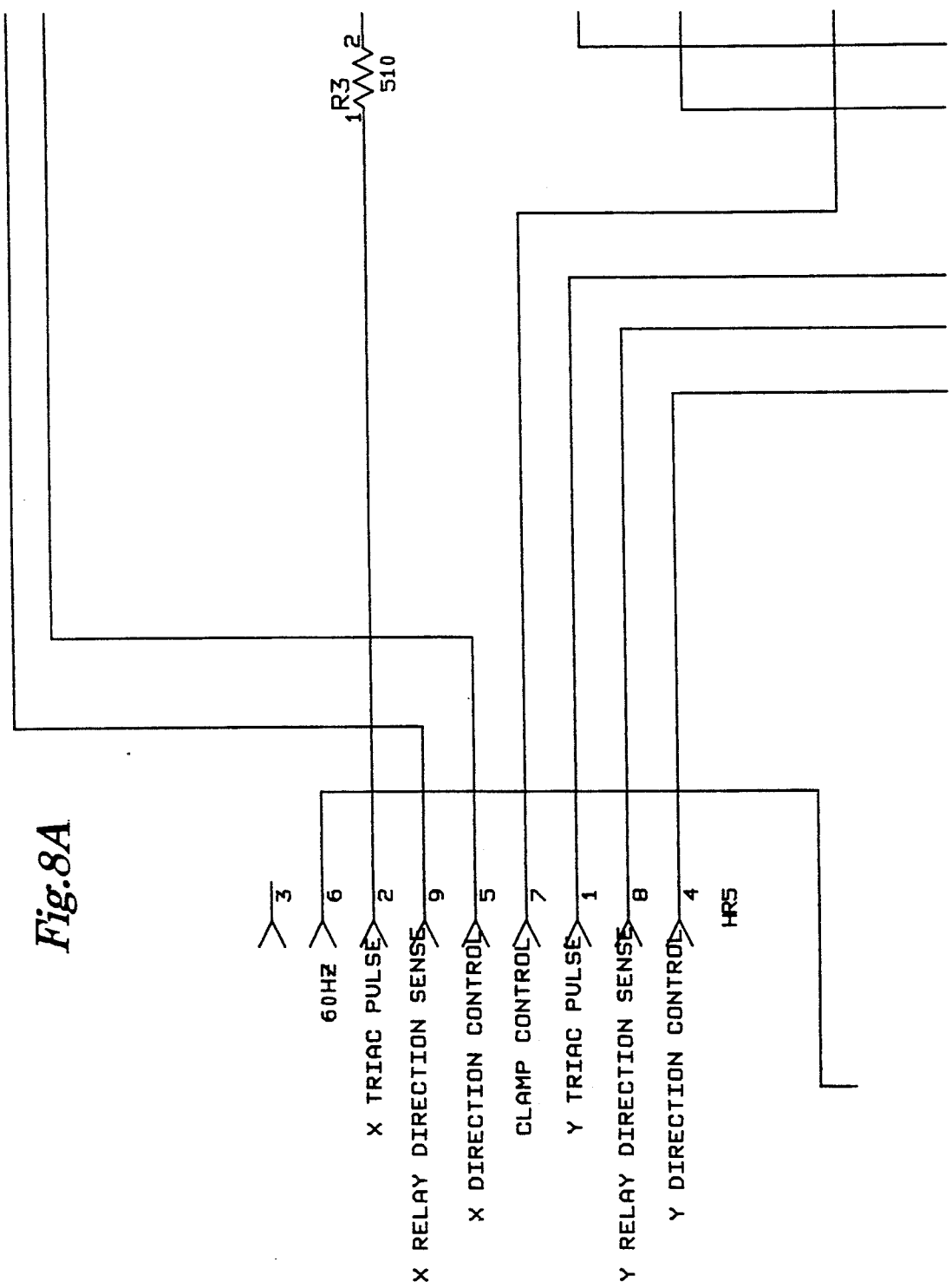
FIG. 8 is a detailed circuit schematic diagram of the auto leveler relay portion of the circuitry.
Figure 8B:
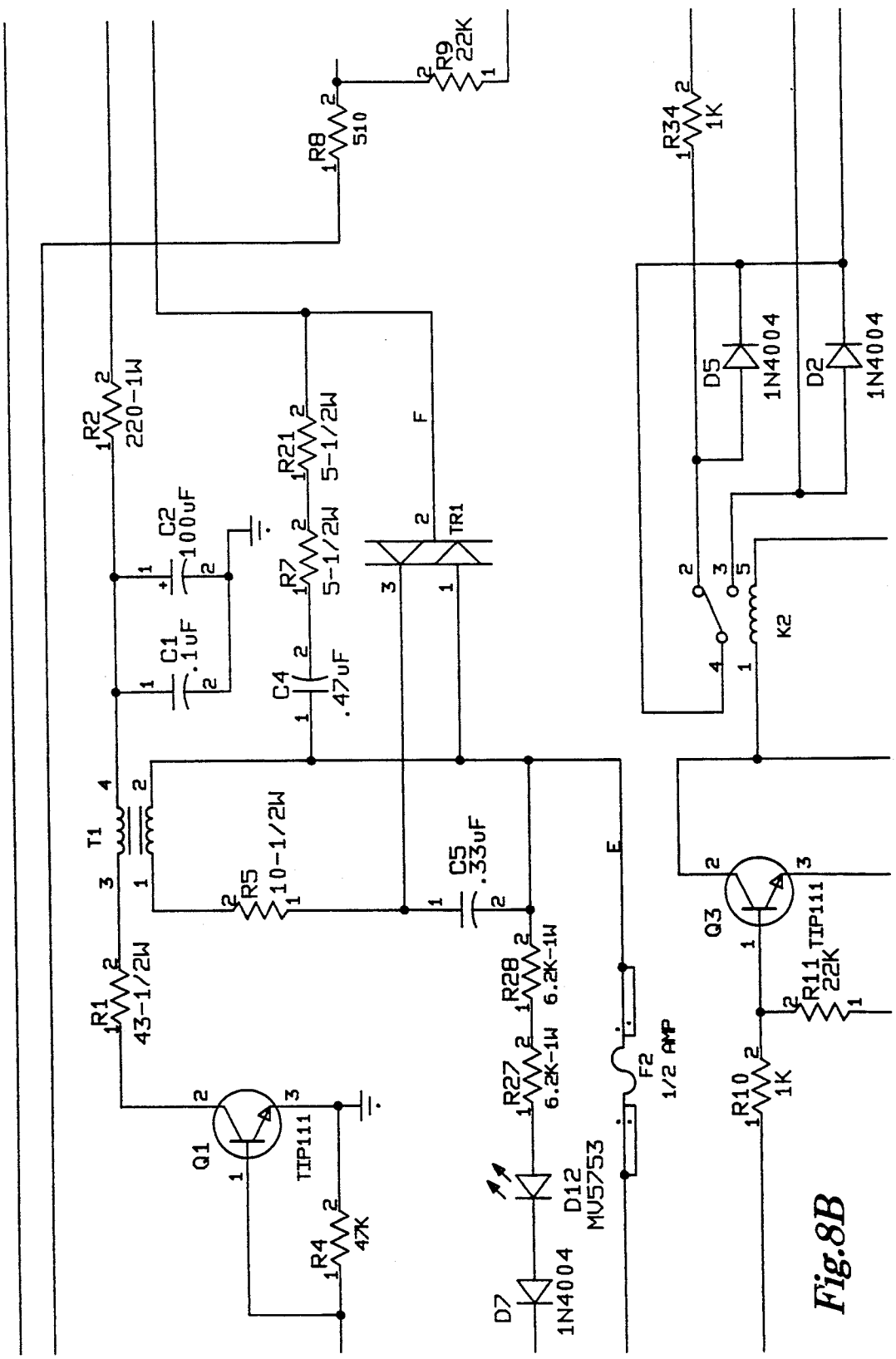
Figure 8C:
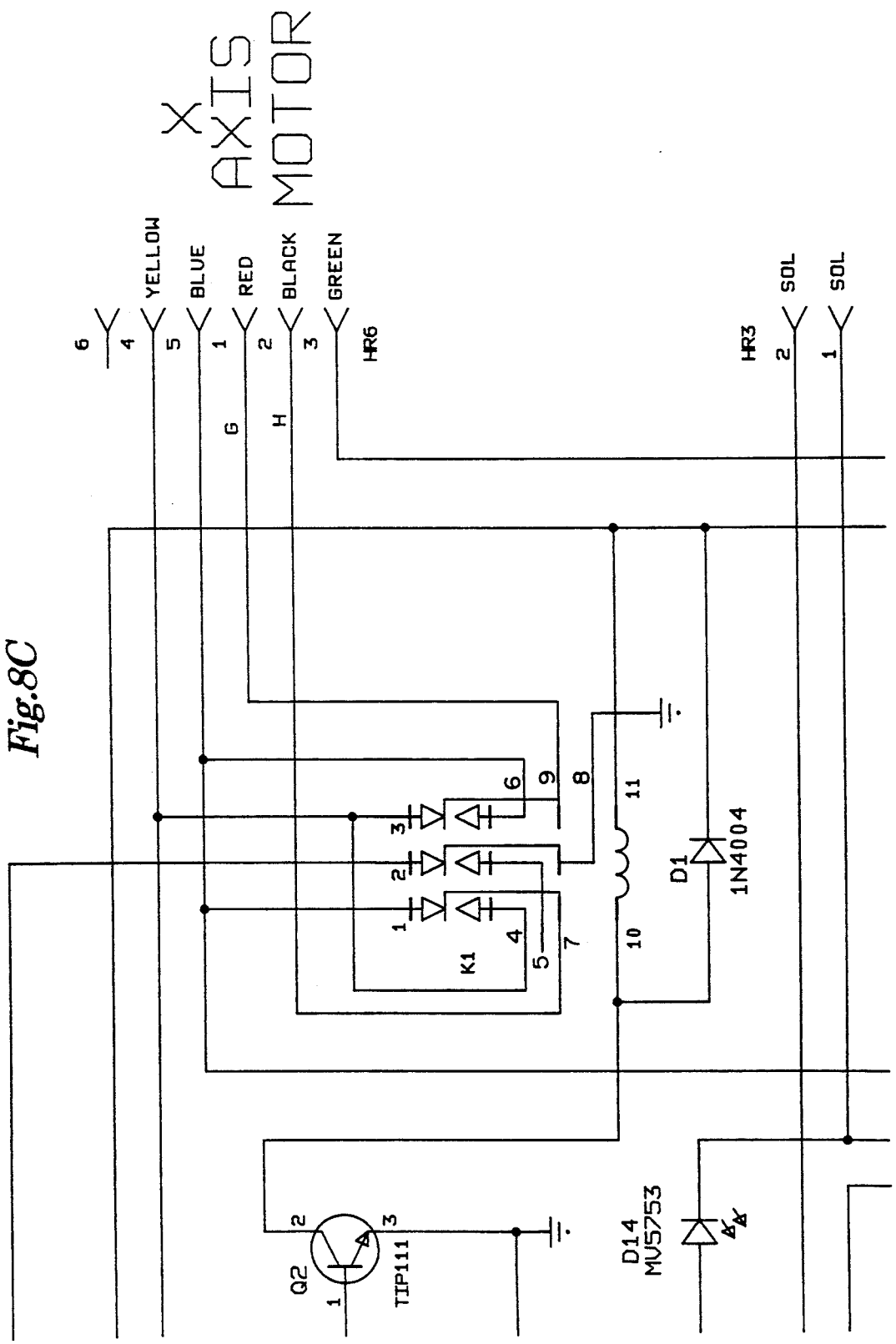
Figure 8D:
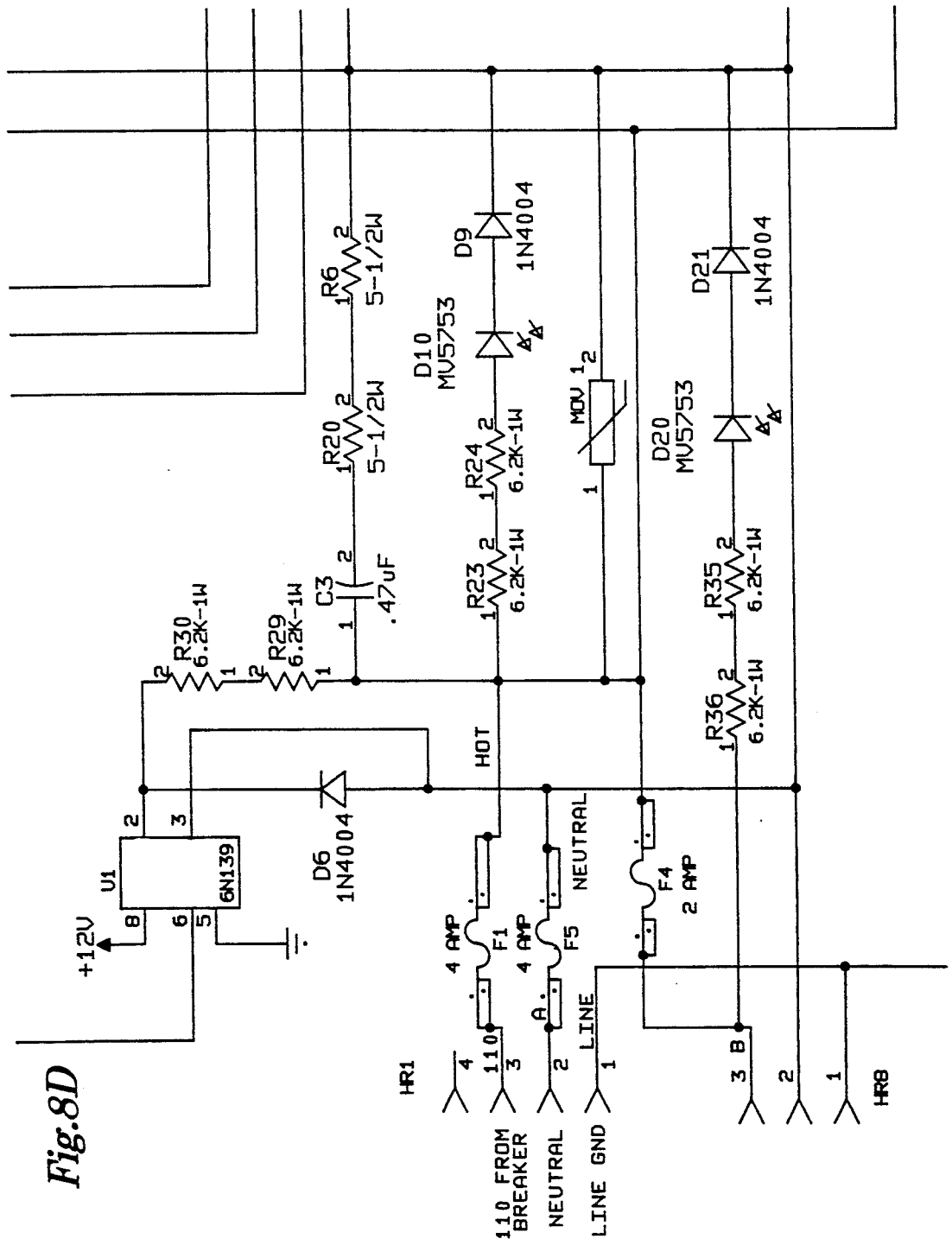
Figure 8E:
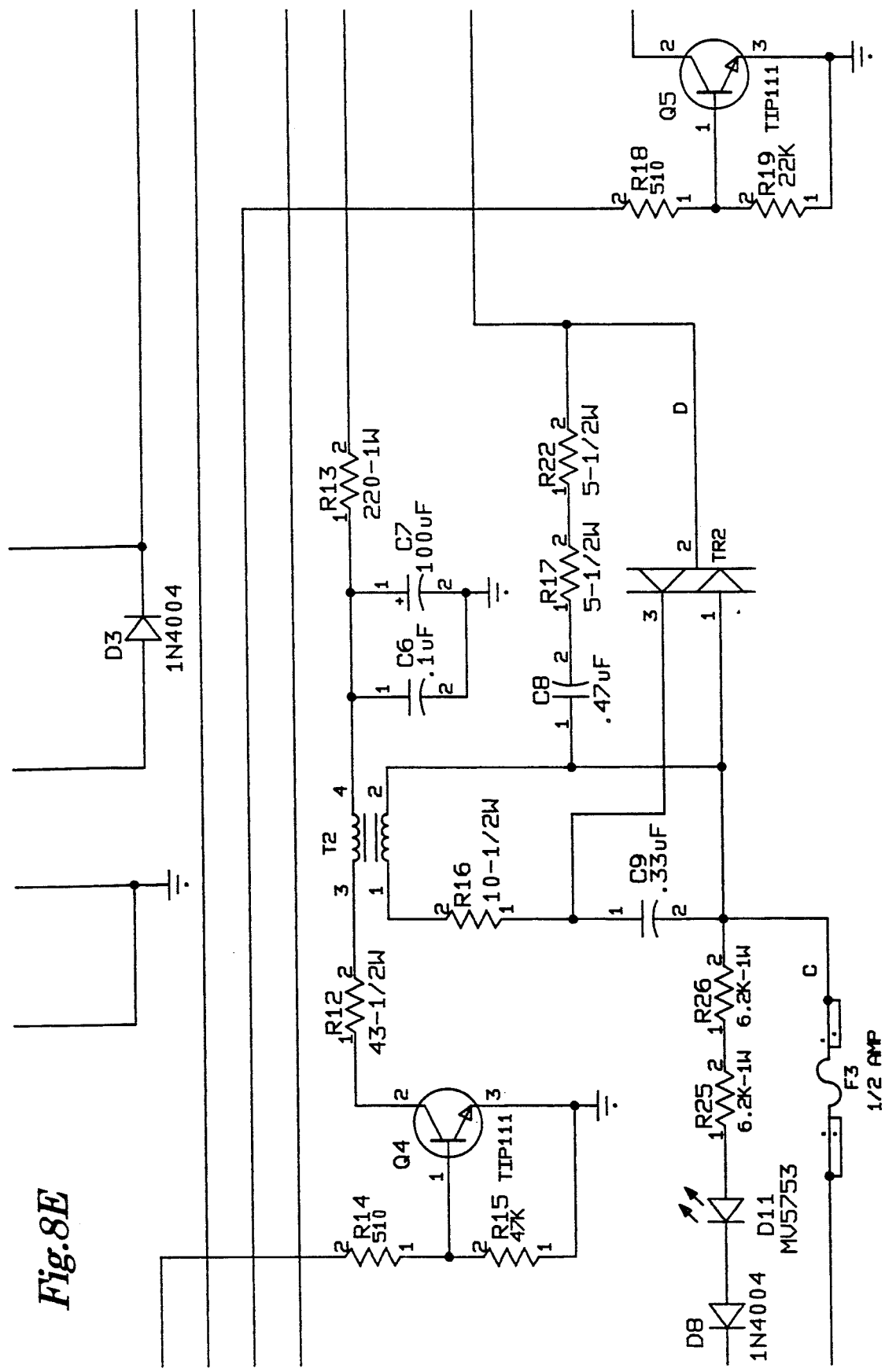
Figure 8F:
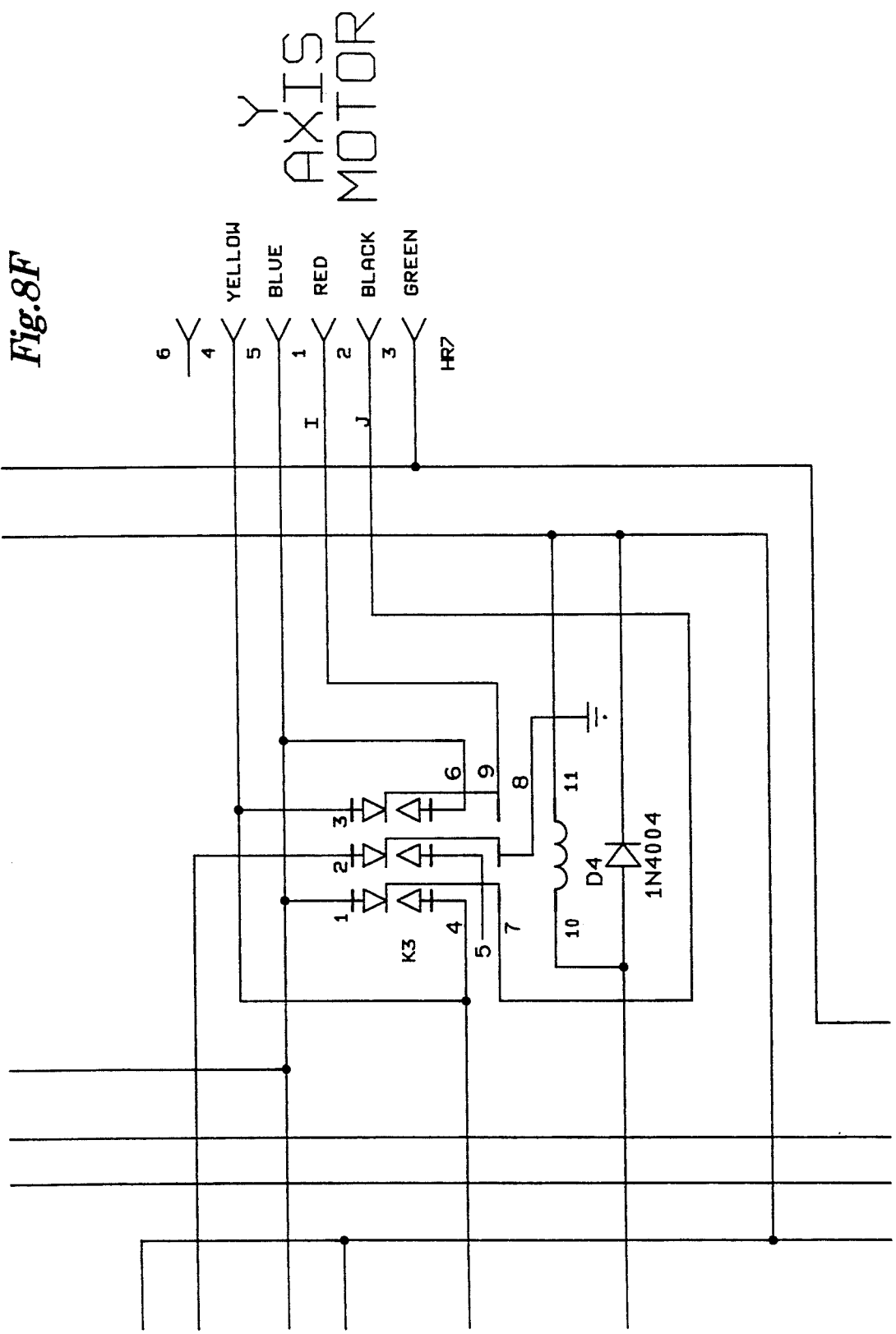
Figure 8G:
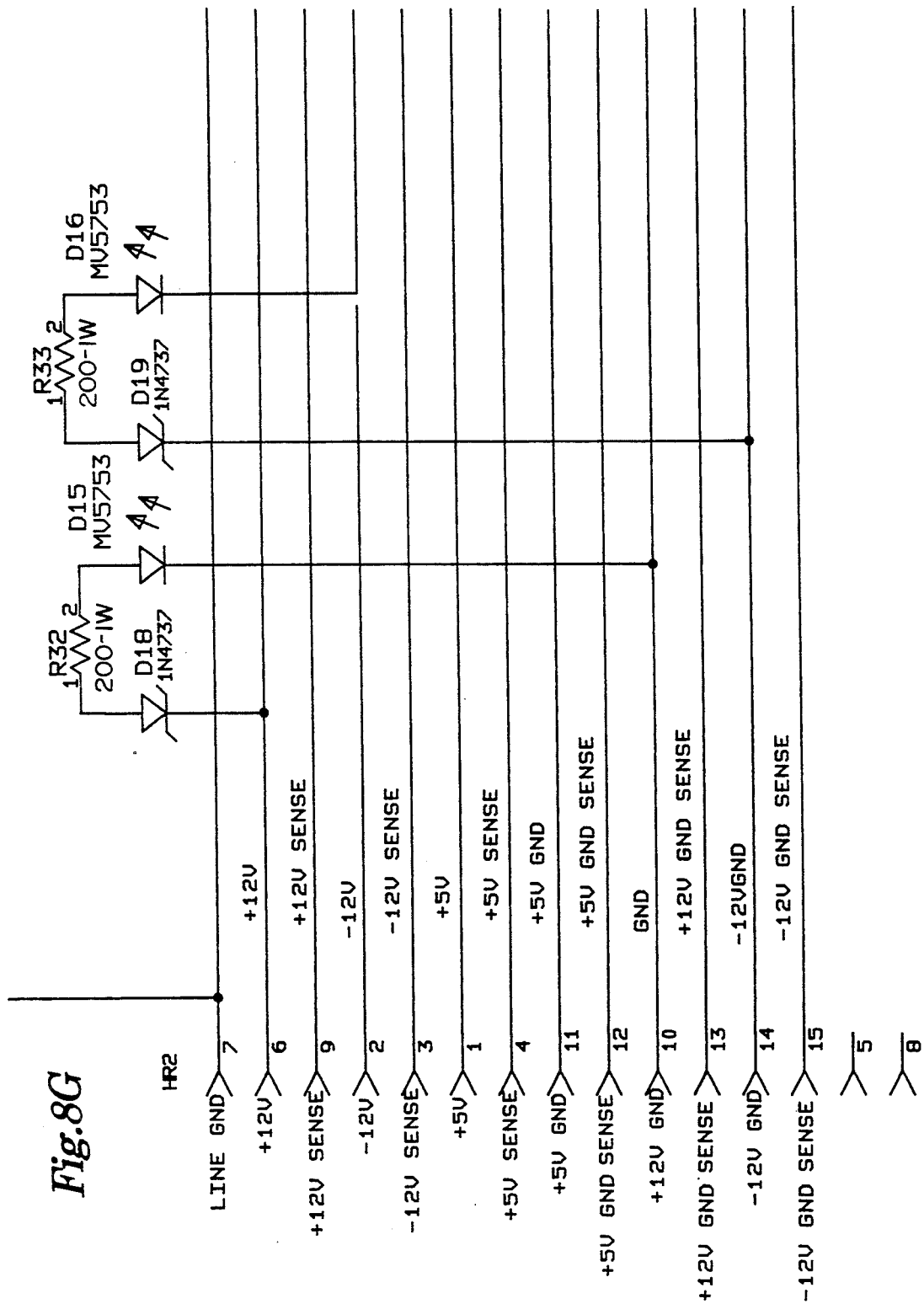
Figure 8H:
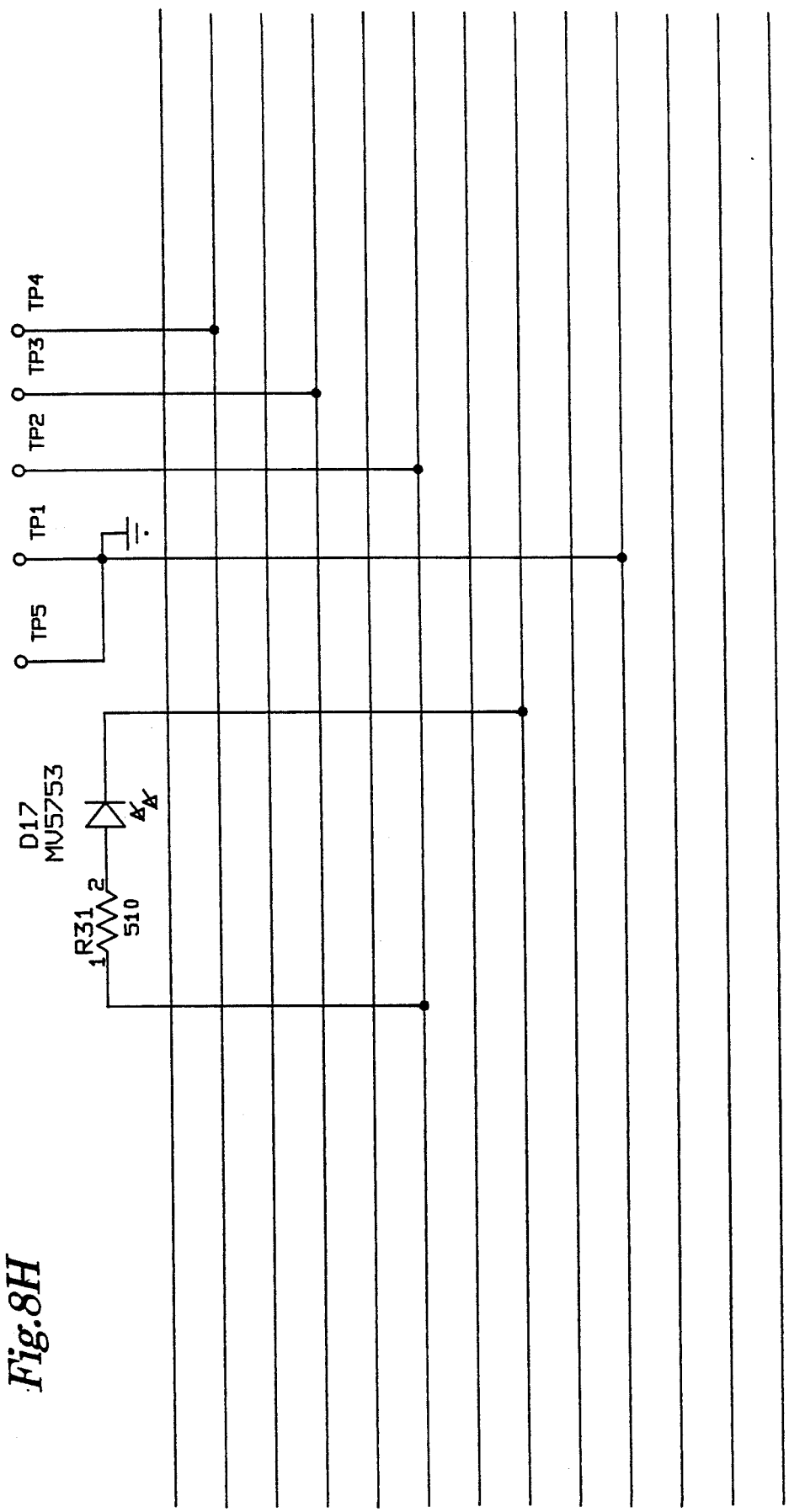
Figure 8I:
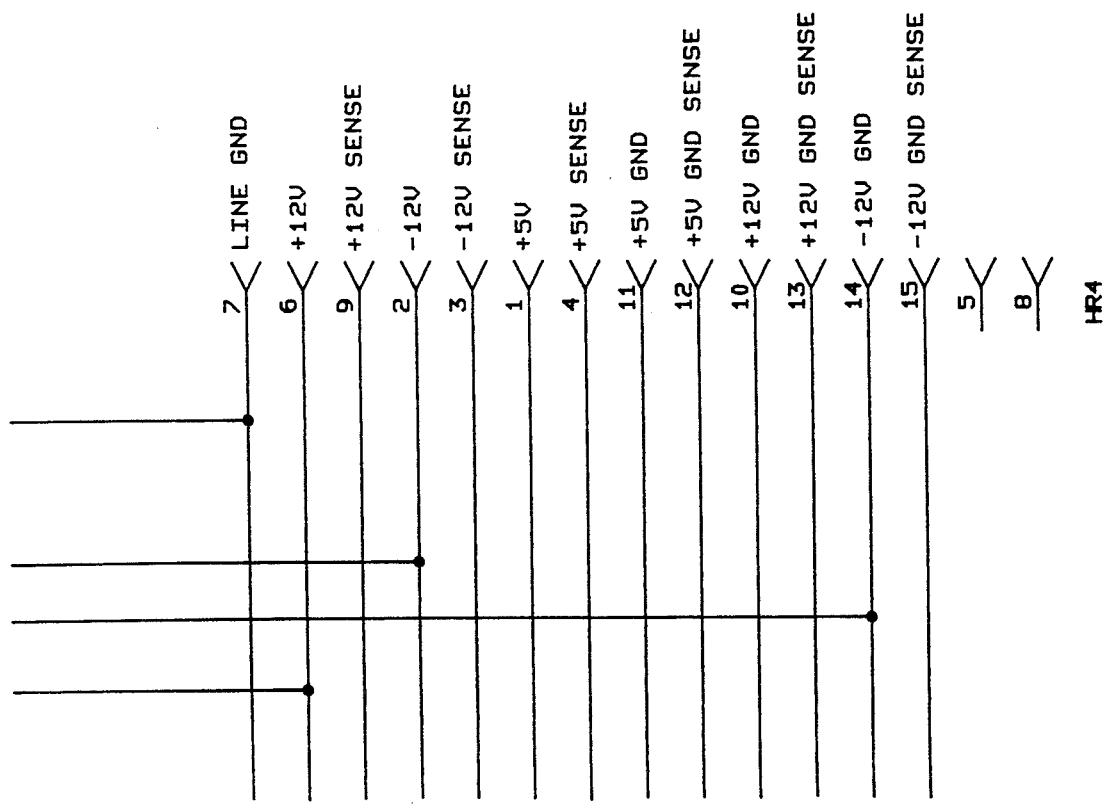

Referring now to FIGS. 7a and 7b, the analog circuitry is shown in which U14, which is an 8038, provides a 400 Hz sinusoidal waveform. This signal is coupled to the sensor 14 by transformers T1 and T2. Sensor 14 is a potted block containing two glass bulbs. The bulbs have a slight curvature and 3 terminals. One terminal is located on each end of the bulb, and one terminal is located centrally. A liquid inside the bulb displaces a vapor bubble. As the bubble moves, the impedance between the terminals changes. The 400 Hz signal input to the sensor 14 is altered by the change in impedance. The center tapped transformers T1 and T2 provide signals to each end of each bubble. The bulb input signals are 180° out of phase. As the bubble moves, the summed amplitude of the two input waveforms is seen at the center terminal. This summed signal and the input signal are demodulated by U2 and U4. A large analog signal indicates the sensor bubble is far from a center location. The signal may be positive or negative, indicating the direction needed for level correction. Circuit elements U9 and U10 shown in FIG. 7b are preamplifiers of the demodulated signals. These signals are multiplexed and again amplified by a selectable gain amplifier. This configuration of the sensor and decoder allows for very high accuracy, down to the seconds of arc.

Referring now to FIG. 8, the auto leveler relay circuitry is shown in which U1 is used to develop a 12 volt square wave from the AC power line. This square wave is an input to the microprocessor and is used to detect zero crossing positions to aid in triggering the triacs (see block 21 in FIG. 5). Also shown are the identical motor control circuits for each motor used to control each motor. Inputs X TRIAC PULSE and Y TRIAC PULSE are generated by the microprocessor and are used to pulse Q1 and Q4 respectively. This pulse is coupled by transformers to the triacs TR1 and TR2 gates. The triacs control the on time of each AC 60 Hz cycle applied to the motors. This microprocessor control can apply partial or complete 60 Hz AC cycles to the AC motors. This enables the motors to perform as DC stepper motors, as is well known in the art. For a similar motor control arrangement please refer to U.S. Pat. No. 4,478,009. Q2 and Q5 energize relays K1 and K3 to control the direction of motors 24 and 26. This is done by using the relays to switch the wiring of the windings of the motors. An air solenoid control is also provided to lock the workpiece in place once the sensor 14 is leveled. The microprocessor generates the signals to initiate the locking.

Figure 10:
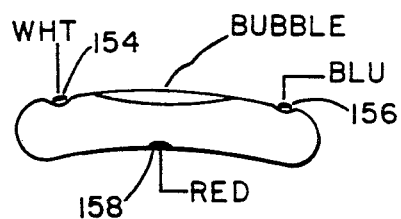
FIG. 10 is a side view of one of the bulbs in the level sensor.
Figure 9:
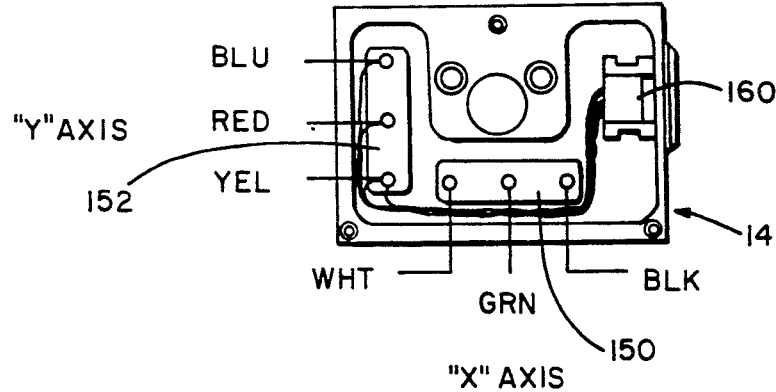
FIG. 9 is top view of the level sensor.

Referring now to FIGS. 9 and 10, a top view of level sensor 14 is shown, in which reference numeral 150 refers to an "X" axis level sensor bulb, and a "Y" axis level sensor bulb shown at 152. Each sensor bulb 150 and 162 has three terminals 154, 156 and 158, with terminals 154 and 156 on the top of the bulb, one at each end. The third terminal 158 is located on the bottom of the bulb directly under the center of the bulb. FIG. 10 shows that each bulb has a slight curvature and contains a liquid which displaces a vapor bubble. As is well known in the art, the vapor bubble always remains at the highest portion of the bubble relative to the ground. As discussed above, a 400 Hz signal is input to both 154 and 156, with the two inputs being 180° out of phase relative to each other. The two signals interfere with each other, and the summed amplitude of the two waveforms input at 154 and 156 is sensed at 158, as discussed above. When the summed amplitude is equal to zero, then the vapor bubble is equidistant between the two terminals 154 and 156, and is exactly in the center of the bulb. Therefore, the axis drawn between the two end points of the bulb is parallel to its respective "X" or "Y" axis.

Figure 11:
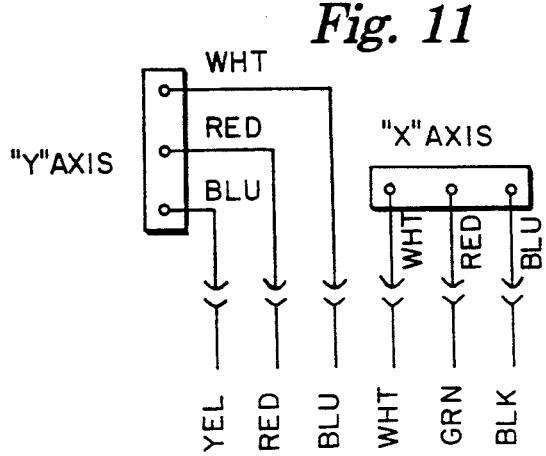
FIG. 11 is a schematic showing the terminals of the bulbs.

FIG. 11 shows the wiring of the terminals to each bulb 150 and 152.

Figure 12:
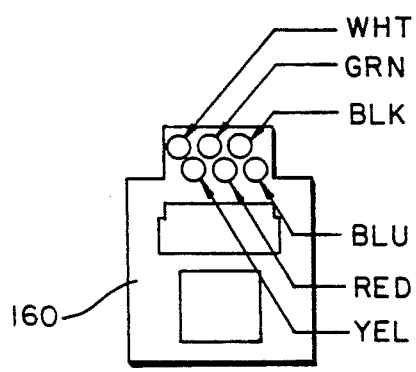
FIG. 12 is rear view of the connector to the level sensor.

FIG. 12 shows the six pin connector 160 mounted in the level sensor 14.

It should be noted that many different circuit arrangements could be routinely engineered which would accomplish the same functions, and are intended to be covered in the scope of this invention.

This completes the description of the preferred and alternate embodiments of the invention. Those skilled in the art may recognize other equivalents to the specific embodiment described herein which equivalents are intended to be encompassed by the claims attached hereto.

What is claimed is:

1. A bi-directional level sensor for providing electronic positioning information about a longitudinal axis relative to ground, which defines an "XY" plane, comprising:
    elongate sensor support means defining a longitudinal axis;
    a pair of elongate sensor bulbs, each having an axis, mounted orthogonally with respect to each other, on top of the elongate sensor support such that both elongate sensor bulb axes are orthogonal to the longitudinal axis of the elongate sensor support means, each sensor bulb containing a predetermined amount of liquid which displaces a vapor bubble, each sensor bulb having a predefined top section, such that when the vapor bubble of the first of said pair of elongate sensor bulbs is contained in said top section, the axis of the bulb is parallel to the "X" axis of ground, and when the vapor bubble of the second of said pair of elongate sensor bulbs is contained in said top section, the axis of the bulb is parallel to the "Y" axis of ground;
    electrical circuit means connected to each bulb, including means for inputing two waveforms into each bulb and further including means for measuring the summed amplitude of the two input waveforms, whereby the location of the vapor bubble relative to the top section may be determined.

2. The bi-directional sensor of claim 1 wherein each bulb has two sides and a top section, and wherein the means connected to each bulb for determining when the vapor bubble is contained in said top section is comprised of a pair of terminals located in predetermined positions on either side of the top section, and a terminal located on the bulb underneath the center of the top section, and further including means for inputing a predetermined waveform into the two terminals on either side of the bulb, one 180° out of phase with respect to the other, and means for sensing the summed amplitude of the two input waveforms at the terminal under the top section, whereby when the two signals cancel each other out the vapor bubble is completely in the top section and the longitudinal axis of the bubble is parallel to its respective "X" or "Y" axis.

3. A bi-directional level sensor having a longitudinal axis for providing electronic positioning information about its longitudinal axis relative to an arbitrary axis, comprising:
    elongate sensor support means defining a longitudinal axis;
    a pair of elongate sensor bulbs, each having an axis, mounted orthogonally with respect to each other, on top of the elongate sensor support such that both elongate sensor bulb axes are orthogonal to the longitudinal axis of the elongate sensor support means, each sensor bulb containing a predetermined amount of liquid which displaces a vapor bubble, each sensor bulb having a predefined top section;
    and electrical circuit means connected to each bulb for determining the location of the vapor bubble relative to the top section, wherein the means is comprised of a pair of electrical terminals located in predetermined positions on either side of the top section, and a third electrical terminal located on the bulb underneath the center of the top section, and further including means for inputing a predetermined waveform into the two terminals on either side of the bulb, one 180° out of phase with respect to the other, and means for sensing the summed amplitude of the two input waveforms at the third electrical terminal.

4. A bubble type level sensor comprising:
    an elongate sensor bulb having an axis, the sensor bulb containing a predetermined amount of liquid which displaces a vapor bubble, the sensor bulb having a predefined center section;
    vapor bubble location means for determining the position of the vapor bubble relative to the predetermined center section wherein the vapor bubble location means is comprised of a pair of electrical terminals located in predetermined positions on either side of the center section, and a third electrical terminal located on the bulb underneath the center of the center section, and further including means for inputing a predetermined waveform into the two terminals on either side of the bulb, one 180° out of phase with respect to the other, and means for sensing the summed amplitude of the two input waveforms at the third electrical terminal.

* * * * *